US011762207B2

(12) United States Patent
Slipy et al.

(10) Patent No.: US 11,762,207 B2
(45) Date of Patent: Sep. 19, 2023

(54) HEAD MOUNTED AUDIO-VISUAL DISPLAY SYSTEM

(71) Applicant: MAGIC LEAP, INC., Plantation, FL (US)

(72) Inventors: Michael John Slipy, Plantation, FL (US); Paul Thomas Foster, Plantation, FL (US); Samantha Jo Gamble, Plantation, FL (US); Masamune Kaji, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 19 days.

(21) Appl. No.: 17/255,652

(22) PCT Filed: Jun. 27, 2019

(86) PCT No.: PCT/US2019/039581
§ 371 (c)(1),
(2) Date: Dec. 23, 2020

(87) PCT Pub. No.: WO2020/006284
PCT Pub. Date: Jan. 2, 2020

(65) Prior Publication Data
US 2021/0271092 A1    Sep. 2, 2021

Related U.S. Application Data

(60) Provisional application No. 62/692,597, filed on Jun. 29, 2018.

(51) Int. Cl.
*G02B 27/01*    (2006.01)

(52) U.S. Cl.
CPC ...... *G02B 27/0176* (2013.01); *G02B 27/0172* (2013.01); *G02B 2027/0178* (2013.01); *G02B 2027/0187* (2013.01)

(58) Field of Classification Search
CPC ............ G02B 27/0176; G02B 27/0172; G02B 27/0149; G02B 27/0093; G02B 2027/0178; G02B 2027/0187; G02B 2027/0152
See application file for complete search history.

(56) References Cited

U.S. PATENT DOCUMENTS

| 9,470,906 B2 | 10/2016 | Kaji et al. |
| D836,105 S * | 12/2018 | Natsume ...................... D14/372 |
| 2002/0096254 A1* | 7/2002 | Kober ..................... H01L 24/33 |
| | | 156/307.3 |

(Continued)

FOREIGN PATENT DOCUMENTS

| CN | 205880373 | 1/2017 |
| KR | 200486291 | 6/2018 |

OTHER PUBLICATIONS

PCT International Search Report, PCT/ISA 220, 210 for International Appln. No PCT/US2019/039581, Applicant Magic Leap, Inc., dated Oct. 9, 2019; 9 pages.

(Continued)

*Primary Examiner* — Ariel A Balaoing
(74) *Attorney, Agent, or Firm* — Vista IP Law Group, LLP

(57) ABSTRACT

A head mounted device padding system includes a pad having an interior side and an exterior side. The interior side of the pad has a substantially concave first curvature about a first axis of the pad, and a substantially convex second curvature about a second axis of the pad.

21 Claims, 57 Drawing Sheets

(56) References Cited

U.S. PATENT DOCUMENTS

| | | | |
|---|---|---|---|
| 2006/0005292 A1* | 1/2006 | Crye | A41D 13/065 2/24 |
| 2006/0070168 A1* | 4/2006 | Nakabayashi | G02B 27/0176 2/171 |
| 2009/0077703 A1* | 3/2009 | Gabry | A41D 13/05 2/16 |
| 2009/0233511 A1* | 9/2009 | Turner | B32B 3/266 442/373 |
| 2010/0095438 A1* | 4/2010 | Moelker | A42B 3/145 2/418 |
| 2013/0086733 A1* | 4/2013 | Szalkowski | A42B 3/125 2/414 |
| 2013/0139304 A1 | 6/2013 | Moelker | |
| 2015/0272257 A1 | 10/2015 | Pritz et al. | |
| 2017/0094816 A1* | 3/2017 | Yun | G02B 27/028 |
| 2017/0153672 A1* | 6/2017 | Shin | G02B 27/0176 |
| 2017/0192198 A1 | 7/2017 | Bristol et al. | |
| 2019/0000233 A1* | 1/2019 | Holland | A47C 7/021 |
| 2019/0056601 A1* | 2/2019 | Lee | G02C 5/143 |
| 2019/0222830 A1* | 7/2019 | Edwin | G06F 3/04815 |
| 2019/0353901 A1* | 11/2019 | Markovsky | G02B 27/0172 |

OTHER PUBLICATIONS

PCT International Preliminary Report on Patentability for International Appln. No. PCT/US2019/039581, Applicant Magic Leap, Inc., dated Dec. 29, 2020.

* cited by examiner

HEAD MOUNTED AUDIO-VISUAL DISPLAY SYSTEM

RELATED APPLICATION DATA

The present application claims priority to PCT Application No. PCT/US2019/039581, filed on Jun. 27, 2019, entitled "HEAD MOUNTED AUDIO-VISUAL DISPLAY SYSTEM," which claims priority to U.S. Provisional Patent Application No. 62/692,597, filed on Jun. 29, 2018, entitled "HEAD MOUNTED AUDIO-VISUAL DISPLAY SYSTEM." The contents of the aforementioned patent applications are hereby expressly and fully incorporated by reference into the present application in their entirety, as though set forth in full.

FIELD OF THE INVENTION

The present disclosure relates to head mounted audio-visual display systems with padding to modulate physical contact between the systems and their users, and method of modulating physical contact between the systems and their users using same.

BACKGROUND

Modern computing and display technologies have facilitated the development of "mixed reality" (MR) systems for so called "virtual reality" (VR) or "augmented reality" (AR) experiences, wherein digitally reproduced images or portions thereof are presented to a user in a manner wherein they seem to be, or may be perceived as, real. A VR scenario typically involves presentation of digital or virtual image information without transparency to actual real-world visual input. An AR scenario typically involves presentation of digital or virtual image information as an augmentation to visualization of the real world around the user (i.e., transparency to real-world visual input). Accordingly, AR scenarios involve presentation of digital or virtual image information with transparency to the real-world visual input.

MR systems typically generate and display color data, which increases the realism of MR scenarios. Many of these MR systems display color data by sequentially projecting sub-images in different (e.g., primary) colors or "fields" (e.g., Red, Green, and Blue) corresponding to a color image in rapid succession. Projecting color sub-images at sufficiently high rates (e.g., 60 Hz, 120 Hz, etc.) may deliver a smooth color MR scenarios in a user's mind.

Various optical systems generate images, including color images, at various depths for displaying MR (VR and AR) scenarios. Some such optical systems are described in U.S. Utility patent application Ser. No. 14/555,585 filed on Nov. 27, 2014, the contents of which are hereby expressly and fully incorporated by reference in their entirety, as though set forth in full.

MR systems typically employ wearable display devices (e.g., head-worn displays, helmet-mounted displays, or smart glasses) that are at least loosely coupled to a user's head, and thus move when the user's head moves. If the user's head motions are detected by the display device, the data being displayed can be updated (e.g., "warped") to take the change in head pose (i.e., the orientation and/or location of user's head) into account.

As an example, if a user wearing a head-worn display device views a virtual representation of a virtual object on the display and walks around an area where the virtual object appears, the virtual object can be rendered for each viewpoint, giving the user the perception that they are walking around an object that occupies real space. If the head-worn display device is used to present multiple virtual objects, measurements of head pose can be used to render the scene to match the user's dynamically changing head pose and provide an increased sense of immersion.

Head-worn display devices that enable AR provide concurrent viewing of both real and virtual objects. With an "optical see-through" display, a user can see through transparent (or semi-transparent) elements in a display system to view directly the light from real objects in an environment. The transparent element, often referred to as a "combiner," superimposes light from the display over the user's view of the real world, where light from by the display projects an image of virtual content over the see-through view of the real objects in the environment. A camera may be mounted onto the head-worn display device to capture images or videos of the scene being viewed by the user.

Current optical systems, such as those in MR systems, optically render virtual content. Content is "virtual" in that if does not correspond to real physical objects located in respective positions in space. Instead, virtual content only exist in the brains (e.g., the optical centers) of a user of the head-worn display device when stimulated by light beams directed to the eyes of the user.

Head pose and head motion related image processing increase the realism of MR scenarios. However, this image processing and VR, AR, and MR systems, in general, have as an operative assumption a substantially fixed relationship between the head mounted audio-visual display systems and the user's head, eyes, and ears. While initial system fitting/customization and real time eye tracking can accommodate some variability in this relationship, most systems can only accommodate a limited range of variability.

Some head mounted audio-visual display systems include compressible padding between the frame of the system, to which various system components are mounted, and the user's head. However, the compressible padding can cause user discomfort, system instability, and fit variability that can affect system effectiveness.

SUMMARY

In one embodiment, a head mounted device padding system includes a pad having an interior side and an exterior side. The interior side of the pad has a substantially concave first curvature about a first axis of the pad, and a substantially convex second curvature about a second axis of the pad.

In one or more embodiments, the first and second axes of the pad are substantially perpendicular to each other. The substantially concave first curvature may be configured to approximate a first body curvature of a user. The substantially convex second curvature may be configured to direct a force resulting from contact between the pad and a user's head toward a direction tangential to the second axis.

In one or more embodiments, the pad is configured to minimize hotspots or sharp corners between the system and a user. The pad may be configured to increase comfort of the user wearing the system. The pad may be configured to direct a force normal corresponding to the system to the center of the pad. The pad may be configured to increase stability of the system on a user wearing the system.

In one or more embodiments, the pad includes a first portion adjacent the interior side. The pad may also include a first adhesive layer adjacent to and external of the first portion. The pad may further include a carrier adjacent to and external of the first adhesive layer. Moreover, the pad may include a second adhesive layer adjacent to and external of the carrier. In addition, the pad may include a second portion adjacent to and external of the second adhesive layer. The pad may also include a cover adjacent to and external of the second portion.

In one or more embodiments, the first portion is configured to dampen vibrations from the system. The first portion may include an EVA foam. The first adhesive layer may include an adhesive layer and a liquid adhesive.

In one or more embodiments, the carrier is configured to removably couple the pad to a frame of the system. The carrier may include a snap-fit component. The second portion may include a PU memory foam. The second portion may be configured to increase comfort of a user wearing the system. The second portion may be configured to increase stability of the system on a user wearing the system.

In one or more embodiments, the cover includes a non-permeable material. The cover may include PU. The cover may include a textured outer surface. The textured outer surface may have an increased coefficient of friction compared to a non-textured outer surface.

In another embodiment, a head mounted device padding system includes first and second front pads. The system also includes a rear pad. The system further includes left and right side pads. Each of the first and second front pads, the rear pad, and the left and right side pads has an interior side and an exterior side. The interior side of the respective pad has a substantially concave first curvature about a first axis of the respective pad, and a substantially convex second curvature about a second axis of the respective pad.

In one or more embodiments, a line from a center of the first and second front pads to a center of the rear pad forms an angle with a transverse plane of a user's head. The angle may be about 10 degrees. The substantially convex second curvature of the rear pad may be less convex than the substantially convex second curvature of the left and right side pads. The first and second front pads may be stiffer than the rear pad and the left and right side pads. The first and second front pads may have a smaller than 3 mm change in thickness between an uncompressed, unworn state and a compressed, worn state.

Additional and other objects, features, and advantages of the disclosure are described in the detail description, figures and claims.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosures briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which.

DETAILED DESCRIPTION

Figure 1:
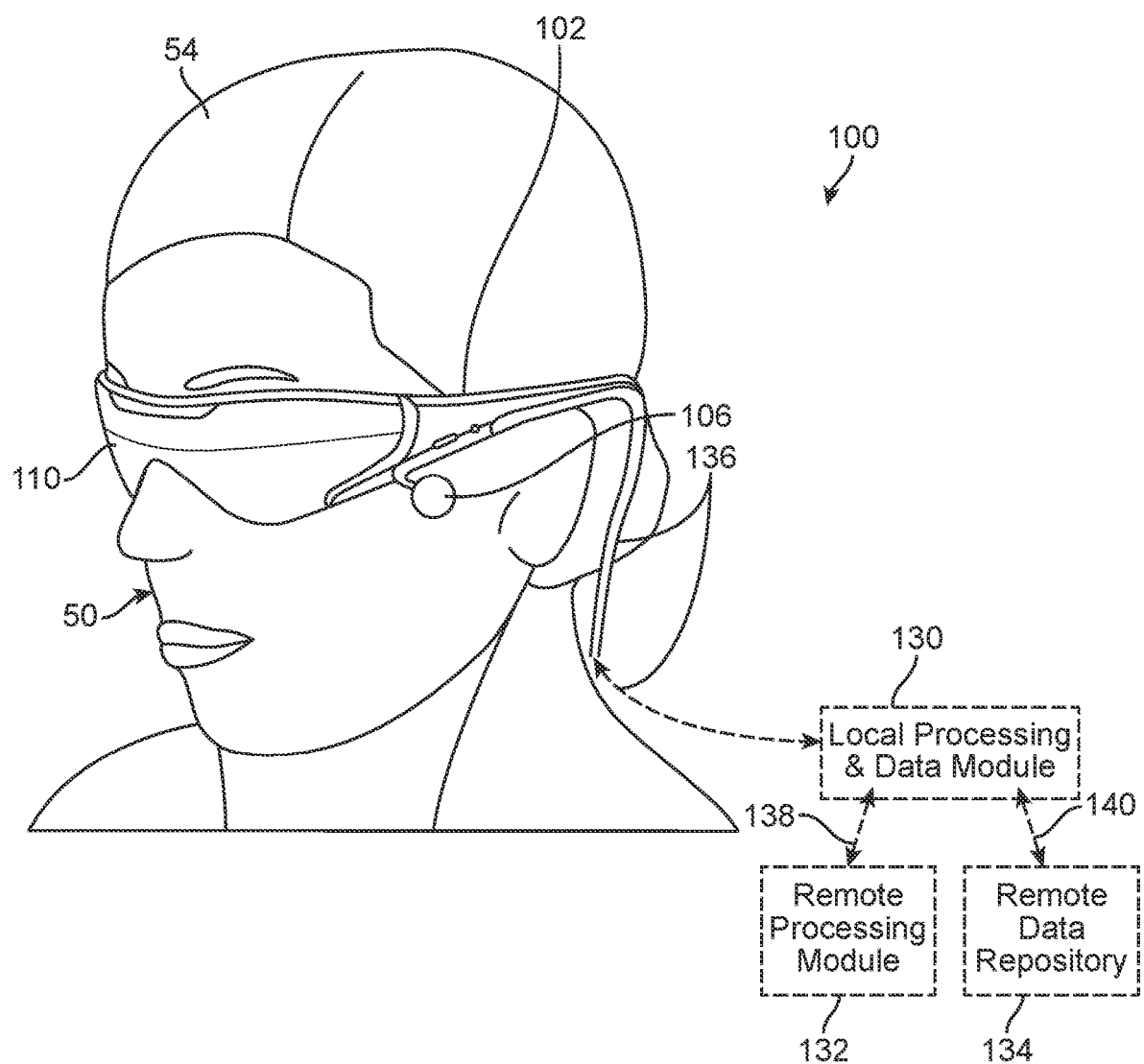
FIGS. 1-4 schematically depict VR/AR/MR systems and subsystems thereof, according to some embodiments.
Figure 2:
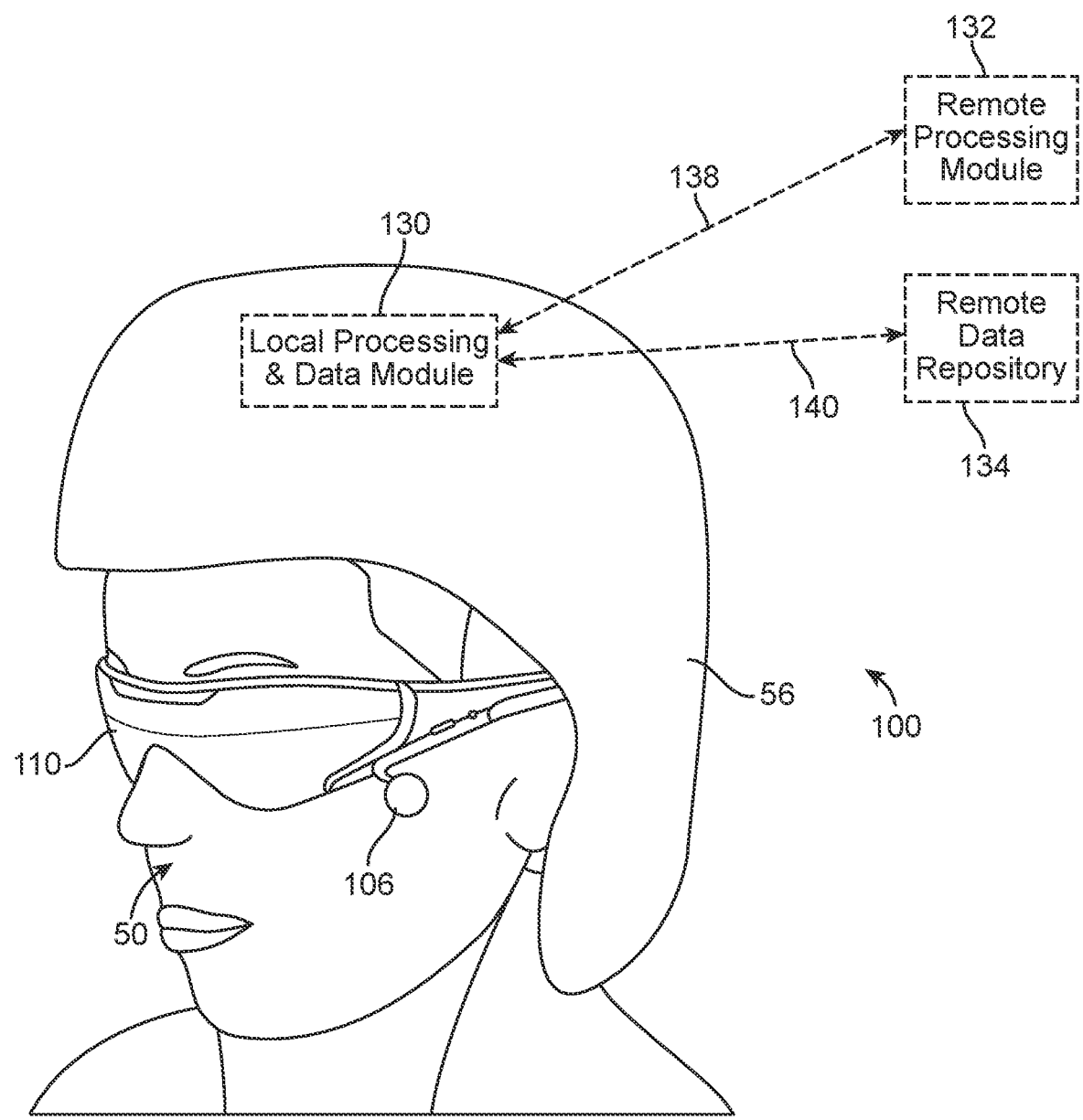
Figure 3:
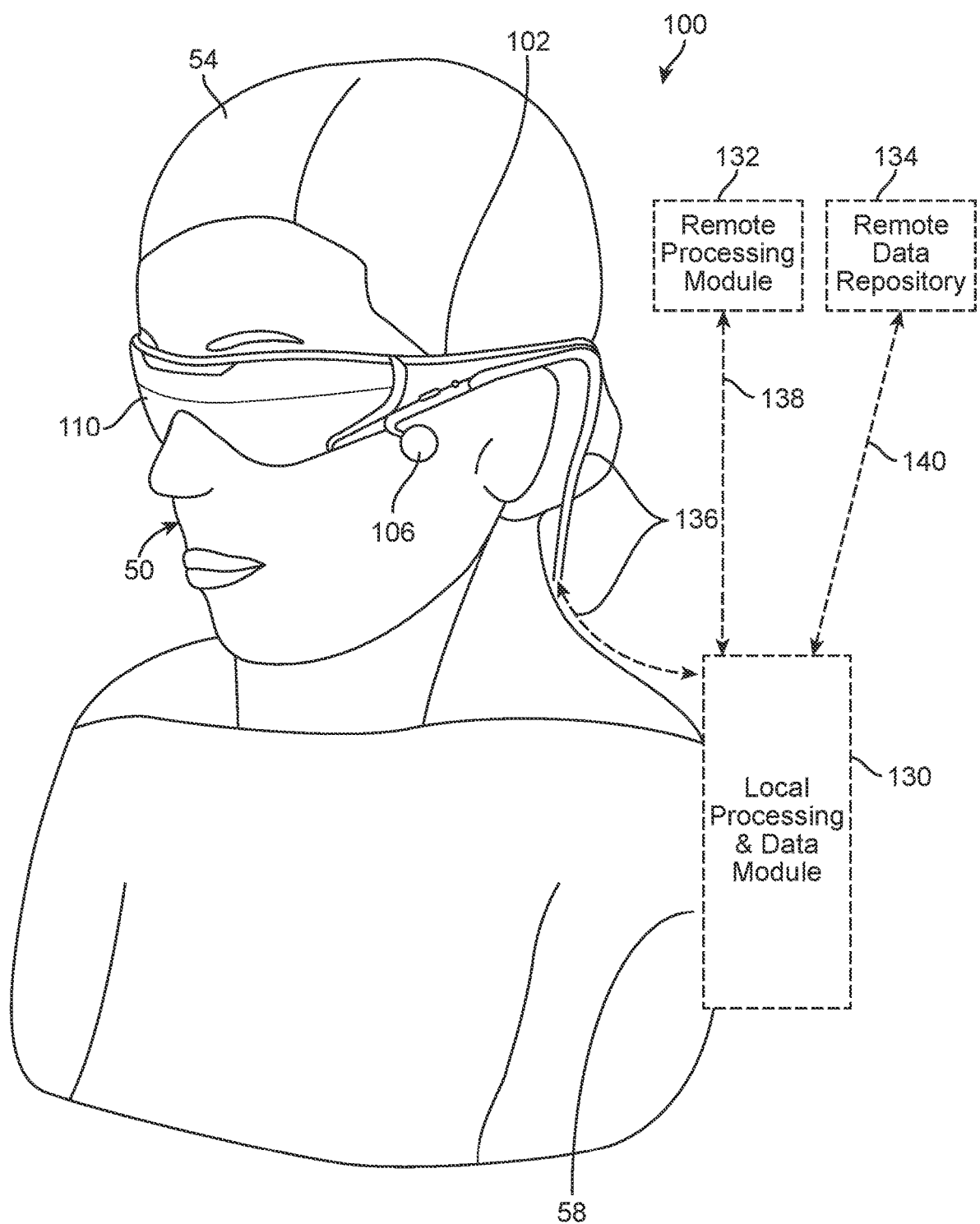

Various embodiments of the disclosure are directed to systems, methods, and articles of manufacture for modulating physical contact between head mounted audio-visual display systems and their users (e.g., using partially convex padding) in a single embodiment or in multiple embodiments. Other objects, features, and advantages of the disclosure are described in the detailed description, figures, and claims.

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

The head mounted audio-visual display system and user physical contact modulating between systems may be implemented independently of AR/MR systems, but some embodiments below are described in relation to AR/MR systems for illustrative purposes only. The contact modulating systems described herein may also be used in an identical manner with VR systems.

Illustrative VR, AR, and/or MR System

The description that follows pertains to an illustrative VR, AR, and/or MR system with which the contact modulating system may be practiced. However, it is to be understood that the embodiments also lends themselves to applications in other types of display systems (including other types of VR, AR, and/or MR systems), and therefore the embodiments are not to be limited to only the illustrative system disclosed herein.

Various components of VR, AR, and/or MR virtual image systems 100 are depicted in FIGS. 1 to 4. The virtual image generation system 100 comprises a frame structure 102 worn by an end user 50, a display subsystem 110 carried by the frame structure 102, such that the display subsystem 110 is positioned in front of the eyes of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display subsystem 110 is designed to present the eyes of the end user 50 with light patterns that can be comfortably perceived as augmentations to physical reality, with high-levels of image quality and three-dimensional perception, as well as being capable of presenting two-dimensional content. The display subsystem 110 presents a sequence of frames at high frequency that provides the perception of a single coherent scene.

In the illustrated embodiments, the display subsystem 110 employs "optical see-through" display through which the user can directly view light from real objects via transparent (or semi-transparent) elements. The transparent element, often referred to as a "combiner," superimposes light from the display over the user's view of the real world. To this end, the display subsystem 110 comprises a partially transparent display. The display is positioned in the end user's 50 field of view between the eyes of the end user 50 and an ambient environment, such that direct light from the ambient environment is transmitted through the display to the eyes of the end user 50.

In the illustrated embodiments, an image projection assembly provides light to the partially transparent display, thereby combining with the direct light from the ambient environment, and being transmitted from the display to the eyes of the user 50. The projection subsystem may be an optical fiber scan-based projection device, and the display may be a waveguide-based display into which the scanned light from the projection subsystem is injected to produce, e.g., images at a single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (i.e., one layer is within the cone of confusion of an adjacent layer). Additionally or alternatively, picture elements may be blended across two or more layers to increase perceived continuity of transition between layers in the light field, even if those layers are more sparsely stacked (i.e., one layer is outside the cone of confusion of an adjacent layer). The display subsystem 110 may be monocular or binocular.

The virtual image generation system 100 may also include one or more sensors (not shown) mounted to the frame structure 102 for detecting the position and movement of the head 54 of the end user 50 and/or the eye position and inter-ocular distance of the end user 50. Such sensors may include image capture devices (such as cameras), microphones, inertial measurement units, accelerometers, compasses, GPS units, radio devices, and/or gyros). Many of these sensors operate on the assumption that the frame 102 on which they are affixed is in turn substantially fixed to the user's head, eyes, and ears.

The virtual image generation system 100 may also include a user orientation detection module. The user orientation module detects the instantaneous position of the head 54 of the end user 50 (e.g., via sensors coupled to the frame 102) and may predict the position of the head 54 of the end user 50 based on position data received from the sensors. Detecting the instantaneous position of the head 54 of the end user 50 facilitates determination of the specific actual object that the end user 50 is looking at, thereby providing an indication of the specific virtual object to be generated in relation to that actual object and further providing an indication of the position in which the virtual object is to be displayed. The user orientation module may also track the eyes of the end user 50 based on the tracking data received from the sensors.

The virtual image generation system 100 may also include a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

The control subsystem of virtual image generation system 100 may include a central processing unit (CPU), a graphics processing unit (GPU), one or more frame buffers, and a three-dimensional data base for storing three-dimensional scene data. The CPU may control overall operation, while the GPU may render frames (i.e., translating a three-dimensional scene into a two-dimensional image) from the three-dimensional data stored in the three-dimensional data base and store these frames in the frame buffers. One or more additional integrated circuits may control the reading into and/or reading out of frames from the frame buffers and operation of the image projection assembly of the display subsystem 110.

Figure 4:
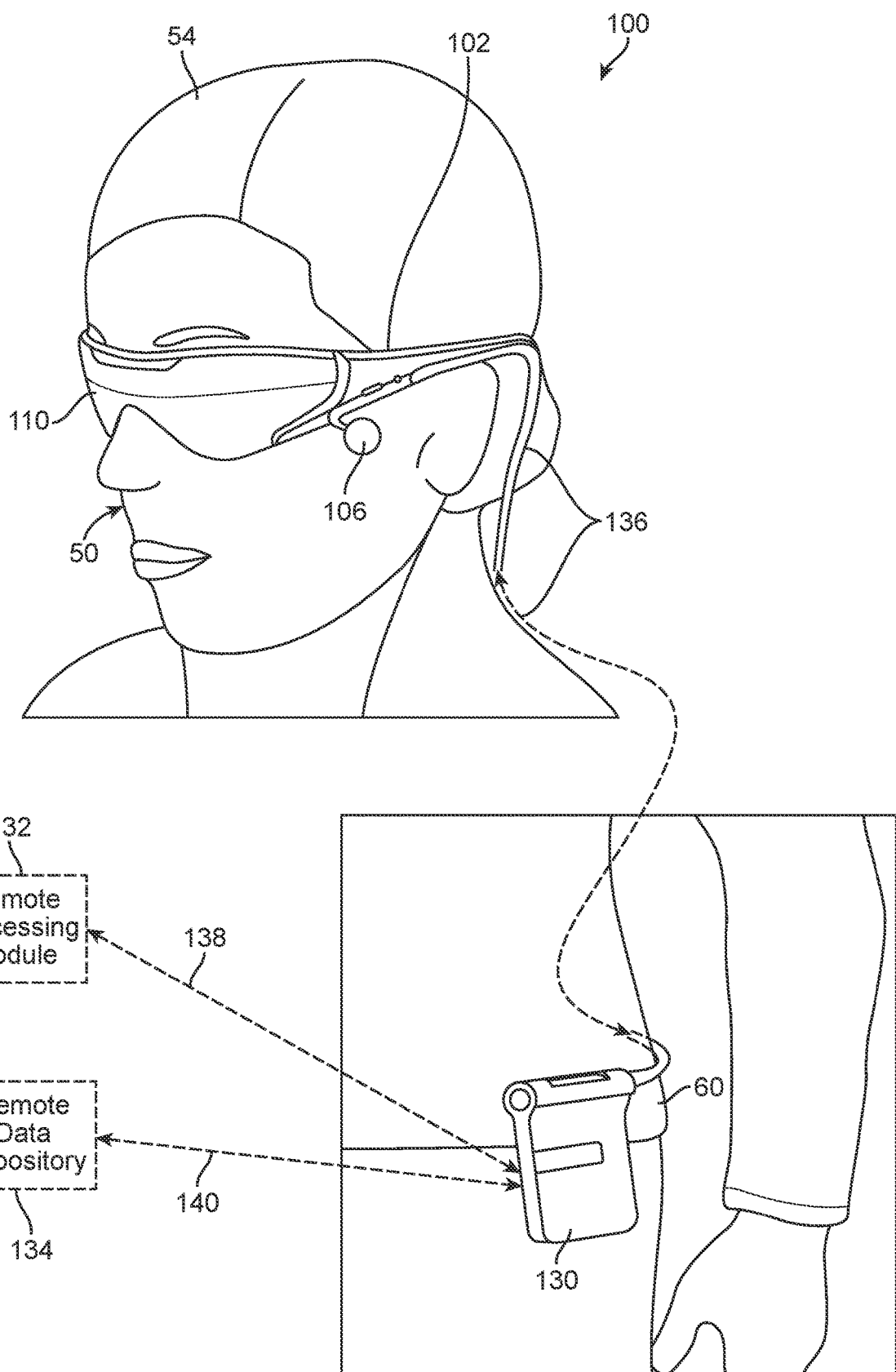

The various processing components of the virtual image generation system 100 may be physically contained in a distributed subsystem. For example, as illustrated in FIGS. 1 to 4, the virtual image generation system 100 may include a local processing and data module 130 operatively coupled, such as by a wired lead or wireless connectivity 136, to the display subsystem 110 and sensors. The local processing and data module 130 may be mounted in a variety of configurations, such as fixedly attached to the frame structure 102 (FIG. 1), fixedly attached to a helmet or hat 56 (FIG. 2), removably attached to the torso 58 of the end user 50 (FIG. 3), or removably attached to the hip 60 of the end user 50 in a belt-coupling style configuration (FIG. 4). The virtual image generation system 100 may also include a remote processing module 132 and remote data repository 134 operatively coupled, such as by a wired lead or wireless connectivity 138, 140, to the local processing and data module 130, such that these remote modules 132, 134 are operatively coupled to each other and available as resources to the local processing and data module 130.

The local processing and data module 130 may comprise a power-efficient processor or controller, as well as digital memory, such as flash memory, both of which may be utilized to assist in the processing, caching, and storage of data captured from the sensors and/or acquired and/or processed using the remote processing module 132 and/or remote data repository 134, possibly for passage to the display subsystem 110 after such processing or retrieval. The remote processing module 132 may comprise one or more relatively powerful processors or controllers configured to analyze and process data and/or image information. The remote data repository 134 may comprise a relatively large-scale digital data storage facility, which may be available through the internet or other networking configuration in a "cloud" resource configuration. In some embodiments, all data is stored and all computation is performed in the local processing and data module 130, allowing fully autonomous use from any remote modules.

The couplings 136, 138, 140 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 1 to 4. Thus, the particular choice of wired or wireless communications should not be considered limiting.

In some embodiments, the user orientation module is contained in the local processing and data module 130, while CPU and GPU are contained in the remote processing module. In alternative embodiments, the CPU, GPU, or portions thereof may be contained in the local processing and data module 130. The 3D database can be associated with the remote data repository 134 or disposed locally.

Some VR, AR, and/or MR systems use a plurality of volume phase holograms, surface-relief holograms, or light guiding optical elements that are embedded with depth plane information to generate images that appear to originate from respective depth planes. In other words, a diffraction pattern, or diffractive optical element ("DOE") may be embedded within or imprinted/embossed upon a light guiding optical element ("LOE"; e.g., a planar waveguide) such that as collimated light (light beams with substantially planar wavefronts) is substantially totally internally reflected along the LOE, it intersects the diffraction pattern at multiple locations and exits toward the user's eye. The DOEs are configured so that light exiting therethrough from an LOE are verged so that they appear to originate from a particular depth plane. The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (½ diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2N or 3N stacked LOEs may be used to generate RGB colored images at N depth planes.

In order to present 3-D virtual content to the user, the VR, AR, and/or MR system projects images of the virtual content into the user's eye so that they appear to originate from various depth planes in the Z direction (i.e., orthogonally away from the user's eye). In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In other embodiments, the user may perceive multiple objects simultaneously at different depth planes. For example, the user may see a virtual dragon appear from infinity and run towards the user. Alternatively, the user may simultaneously see a virtual bird at a distance of 3 meters away from the user and a virtual coffee cup at arm's length (about 1 meter) from the user.

Figure 5:
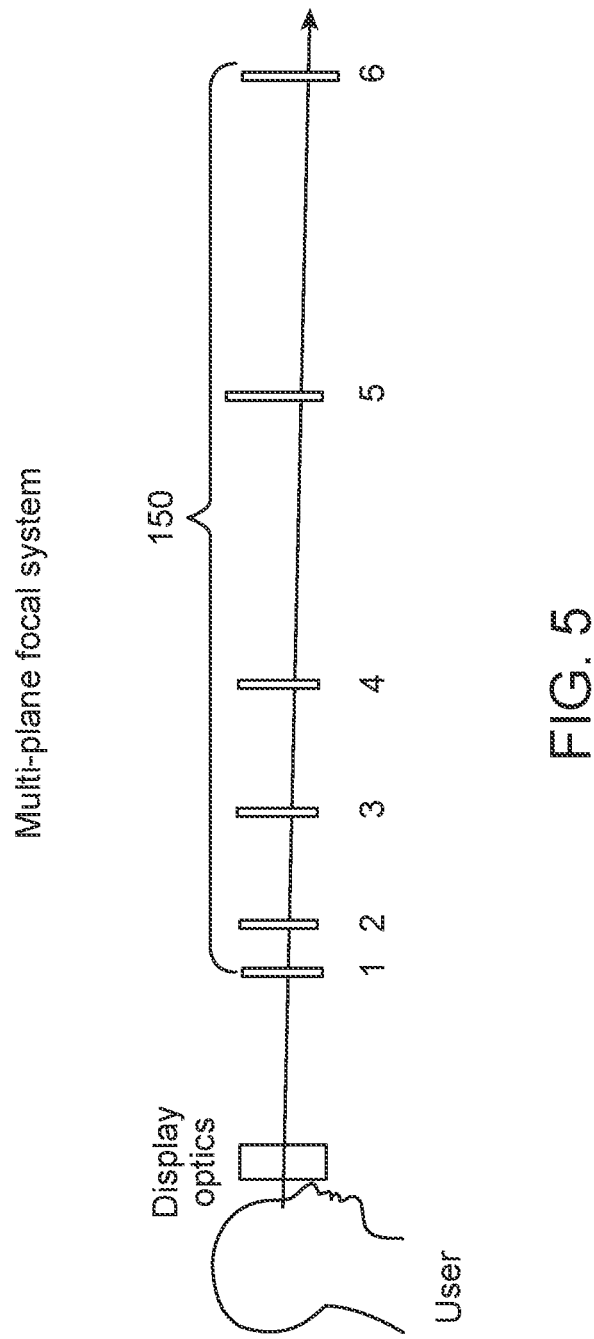
FIG. 5 depicts the focal planes of a VR/AR/MR system, according to some embodiments.

Multiple-plane focus systems create a perception of variable depth by projecting images on some or all of a plurality of depth planes located at respective fixed distances in the Z direction from the user's eye. Referring now to FIG. 5, it should be appreciated that multiple-plane focus systems may display frames at fixed depth planes 150 (e.g., the six depth planes 150 shown in FIG. 5). Although MR systems can include any number of depth planes 150, one exemplary multiple-plane focus system has six fixed depth planes 150 in the Z direction. In generating virtual content one or more of the six depth planes 150, 3-D perception is created such that the user perceives one or more virtual objects at varying distances from the user's eye. Given that the human eye is more sensitive to objects that are closer in distance than objects that appear to be far away, more depth planes 150 are generated closer to the eye, as shown in FIG. 5. In other embodiments, the depth planes 150 may be placed at equal distances away from each other.

Depth plane positions 150 may be measured in diopters, which is a unit of optical power equal to the inverse of the focal length measured in meters. For example, in some embodiments, depth plane 1 may be ⅓ diopters away, depth plane 2 may be 0.3 diopters away, depth plane 3 may be 0.2 diopters away, depth plane 4 may be 0.15 diopters away, depth plane 5 may be 0.1 diopters away, and depth plane 6 may represent infinity (i.e., 0 diopters away). It should be appreciated that other embodiments may generate depth planes 150 at other distances/diopters. Thus, in generating virtual content at strategically placed depth planes 150, the user is able to perceive virtual objects in three dimensions. For example, the user may perceive a first virtual object as being close to him when displayed in depth plane 1, while another virtual object appears at infinity at depth plane 6.

Alternatively, the virtual object may first be displayed at depth plane 6, then depth plane 5, and so on until the virtual object appears very close to the user. It should be appreciated that the above examples are significantly simplified for illustrative purposes. In another embodiment, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3-D view of the coffee cup.

In some embodiments, the VR, AR, and/or MR system may work as a multiple-plane focus system. In other words, all six LOEs may be illuminated simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE retaining collimation of light (e.g., depth plane 6 from FIG. 5) may be utilized. Then an image of a closer tree branch may be injected at time 2 and an LOE configured to create an image appearing to originate from a depth plane 10 meters away (e.g., depth plane 5 from FIG. 5) may be utilized; then an image of a pen may be injected at time 3 and an LOE configured to create an image appearing to originate from a depth plane 1 meter away may be utilized. This type of paradigm can be repeated in rapid time sequential (e.g., at 360 Hz) fashion such that the user's eye and brain (e.g., visual cortex) perceives the input to be all part of the same image.

VR, AR, and/or MR systems may project images (i.e., by diverging or converging light beams) that appear to originate from various locations along the Z axis (i.e., depth planes) to generate images for a 3-D experience/scenario. As used in this application, light beams include, but are not limited to, directional projections of light energy (including visible and invisible light energy) radiating from a light source. Generating images that appear to originate from various depth planes conforms the vergence and accommodation of the user's eye for that image, and minimizes or eliminates vergence-accommodation conflict.

Summary of Problems and Solutions

Various components of VR, AR, and/or MR virtual image systems 100 described above incrementally increase the weight of the systems 100, and in particular the head mounted portions of the systems 100. These system components include, but are not limited to the frame structure 102, the display subsystem 110 (the projection subsystem and the waveguide-based display/LOEs), the speaker 106, the sensors, the user orientation detection module, the control subsystem (CPUs, GPUs, ASICs, PGAs, FPGAs, PLUs, frame buffers, databases, etc.), local processing and data modules 130, and couplings 136, 138, 140. These components can increase the weight of the head mounted portions of the systems 100 from about 300 g to about 400 g. In one embodiment, the head mounted portion weighs about 370 g. Carrying such weights can lead to discomfort for the user, reducing the usability of the VR, AR, and/or MR virtual image systems 100. Further, the placement of some of these components be asymmetrical resulting in one or more moments of inertia (rotational inertia) about a center of the frame 102 on a user's head. These moments of inertia can reduce the stability of the VR, AR, and/or MR virtual image systems 100 on users' heads, again reducing the usability of the systems 100.

Some of these components interact with the user during operation (e.g., the display subsystem 110, the speaker 106, and the sensors), and have operating principals including a substantially fixed relationship between the head mounted audio-visual display systems and the user's head, eyes, and ears. This operating principal assumes a degree of stability of the VR, AR, and/or MR virtual image systems 100 on users' heads, and instability can reduce the effectiveness of some of these components. Another set of these components (e.g., the display subsystem 110, the speaker 106, and the sensors, the user orientation detection module, the control subsystem, local processing and data modules 130) can generate heat, which can impact the comfort of users wearing the systems.

The VR, AR, and/or MR virtual image systems disclosed herein include one or more pads having respective convex surface along at least one axis to increase user comfort, reduce hotspots and sharp corners, and/or increase system stability on users' heads.

Exemplary Padding Systems

Figure 6:
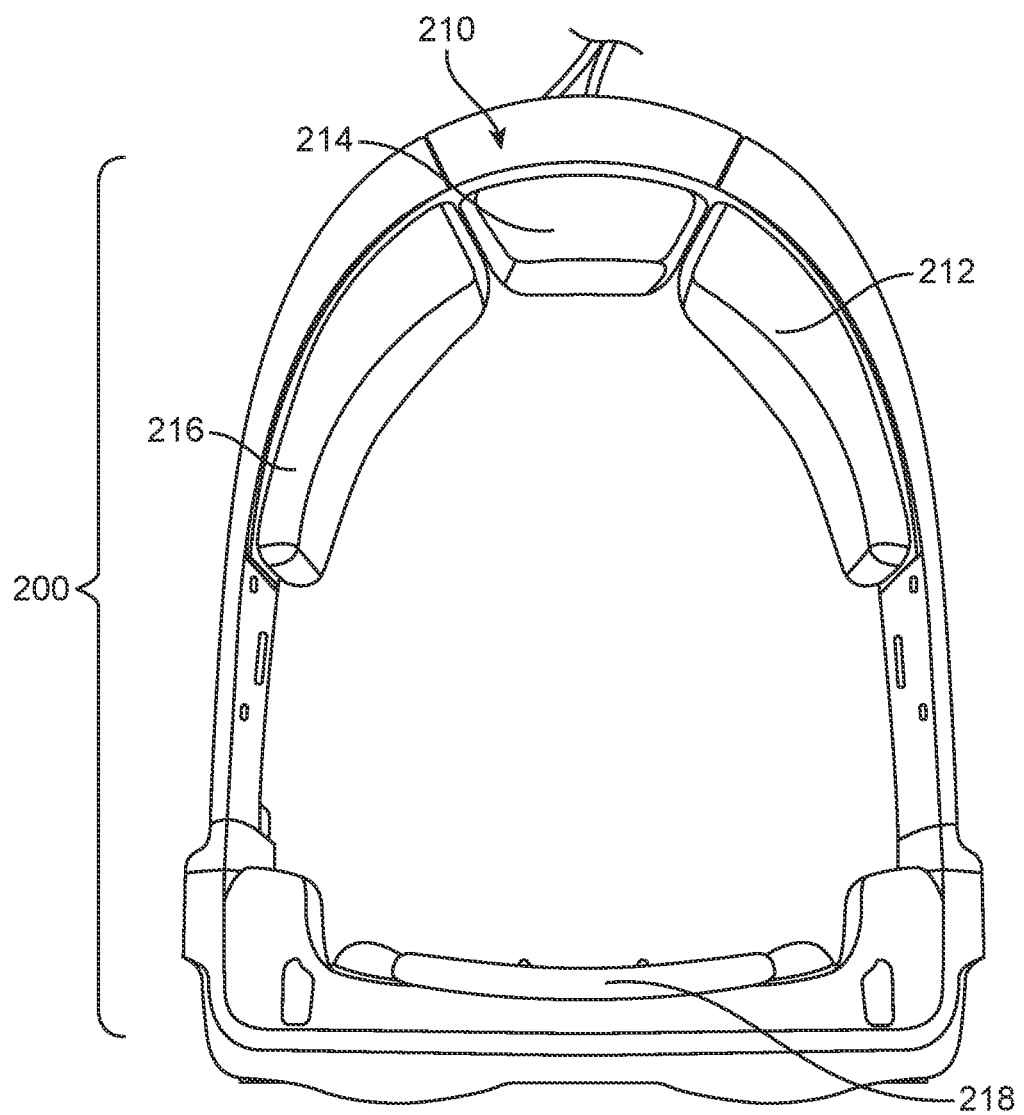
FIGS. 6 and 7 are top views of VR/AR/MR systems, according to some embodiments.
Figure 7:
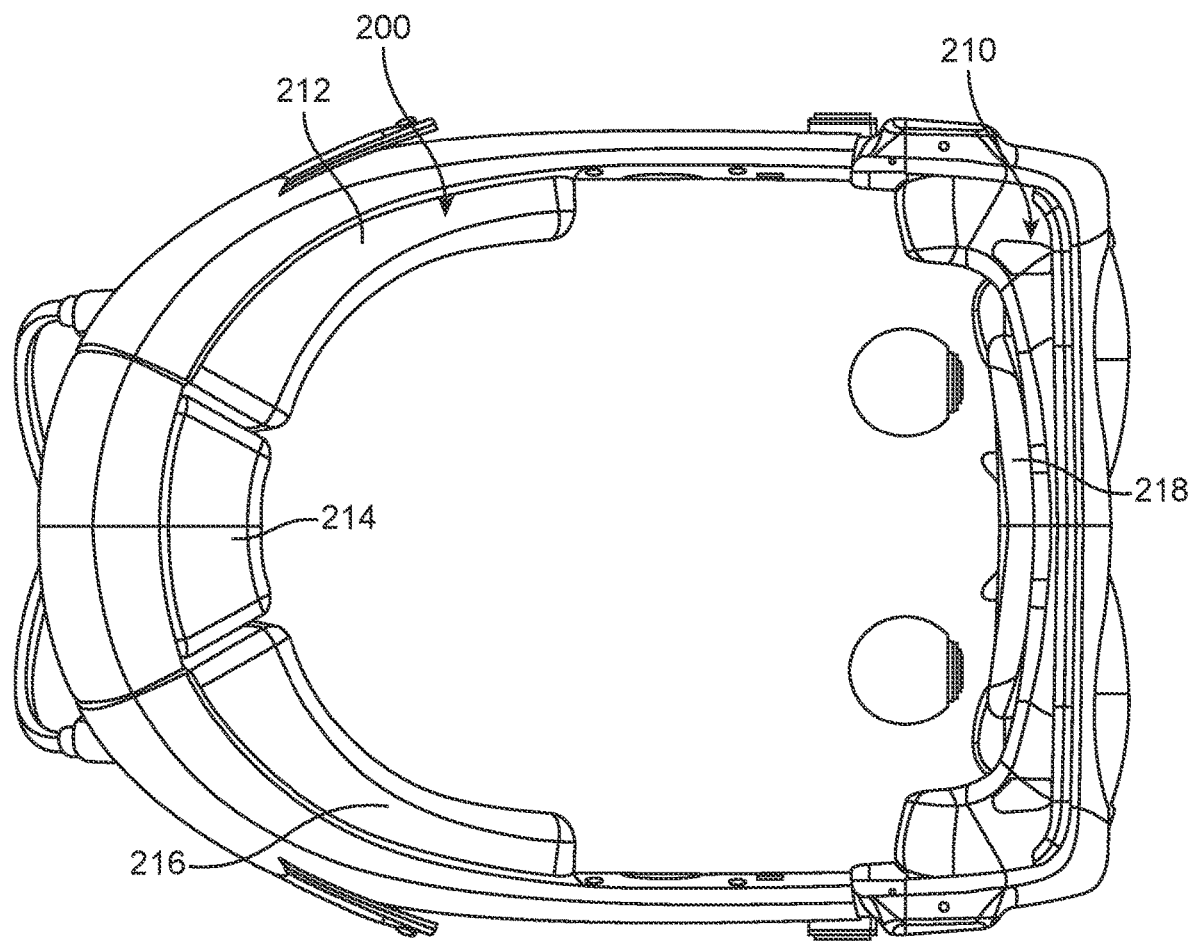
Figure 8:
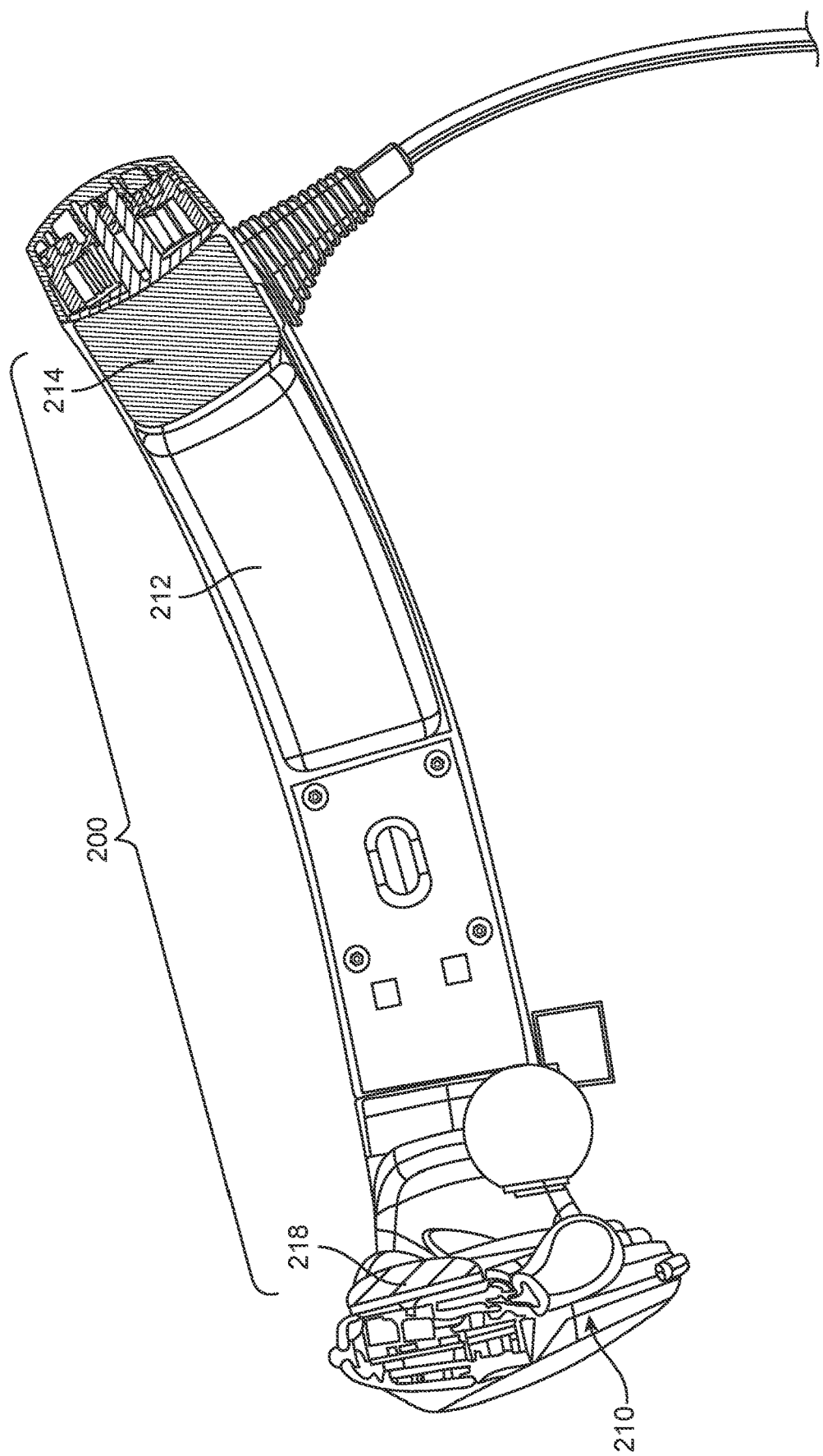
FIG. 8 is a left view of a VR/AR/MR system, according to some embodiments.

FIGS. 6 to 8 depict a padding system 200 for a wearable portion 210 of a VR, AR, and/or MR virtual image system according to some embodiments. The wearable 210 may include the frame 102, display 110, speaker 106, (see e.g., FIG. 1) and other system components that contribute weight to the wearable 210. The padding system 200 includes a left side/temple pad 212, a rear pad 214, a right side/temple pad 216, and a front/forehead pad 218. The left and right pads 212, 216 are configured to be disposed between respective left and right sides of the wearable 210 and a user's 50 left and right temples. The rear pad 214 is configured to be disposed between the rear of the wearable 210 and the back of a user's 50 head. The front pad 218 is configured to be disposed between the front of the wearable 210 and the front of a user's 50 head (i.e., forehead). As a result of their respective positions, the left and right, rear, and front pads 212, 216, 214, 218 modulate the interaction between the wearable 210 and the user's 50 head in order to *increase comfort and therefore usability of the VR/AR/MR system on the user's 50 head. The padding system 200 may increase comfort and usability by reducing hotspots and sharp corners, distributing/balancing system weight, and/or increasing system stability on users' 50 head (described below).

Figure 9:
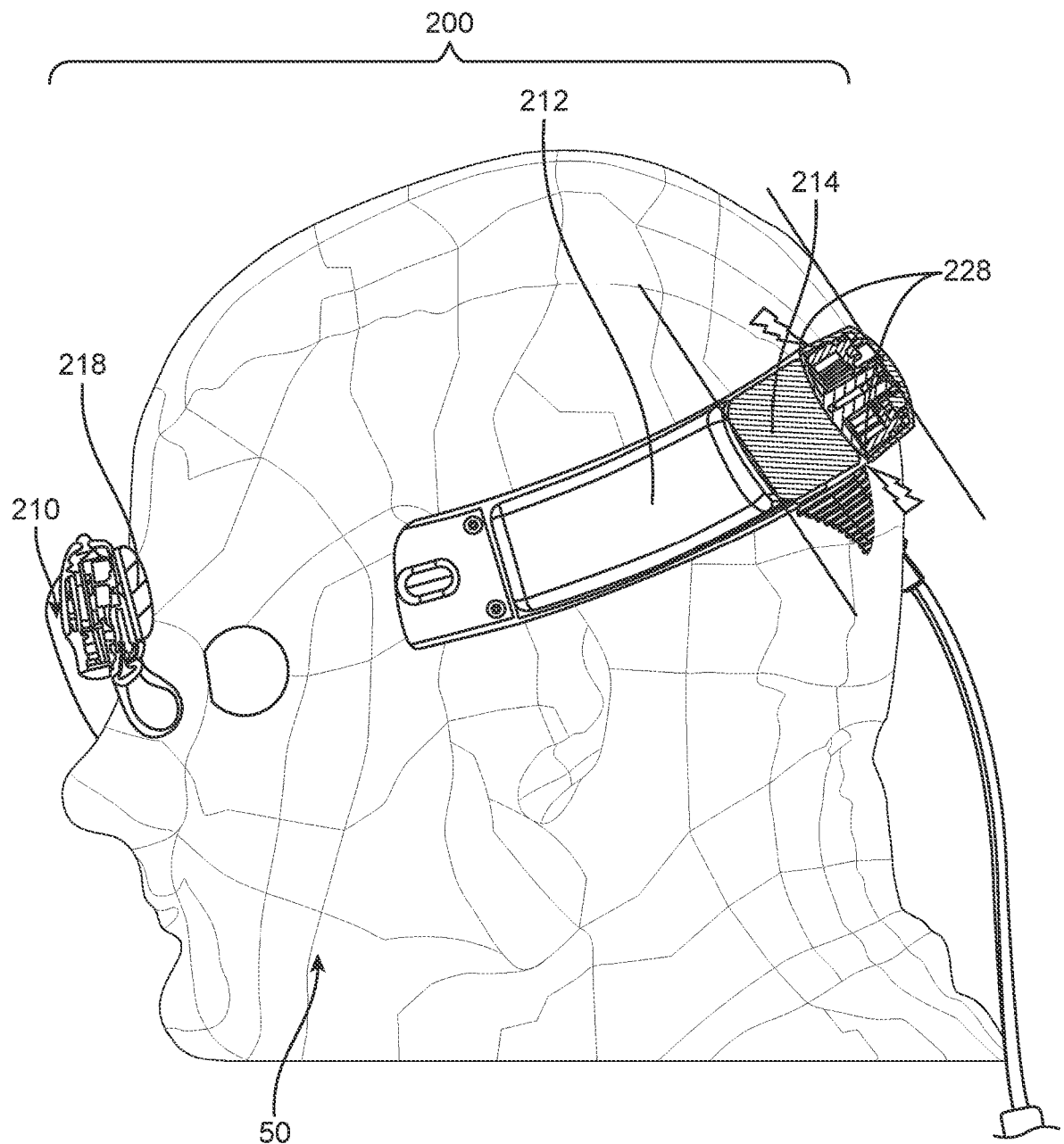
FIGS. 9-11 are left views of VR/AR/MR systems worn on a user's head, according to some embodiments.

FIG. 9 depicts a user 50 wearing a wearable 210 of a VR/AR/MR system. The wearable 210 includes a substantially rigid frame configured to house or support various processing and/or display components, optical components, speaker components, sensor components, and other components for delivering a VR, AR, or MR experience to a user. The rigid frame of wearable 210 can have corners, edges, or protrusions that generate potential "hotspots" 228 where the wearable 210 contacts the user's 50 head. For example, hotspots 228 may exist at a top and bottom edge of side or back portions of the wearable 210 where a user perceives discomfort due to a high concentration of pressure. Hotspots 228 also tend to form where most of the weight of the wearable 210 is supported on the user's 50 head. The curvature and thickness (described below) of the rear pad 214 and temple pads 212 can be modified to minimize hotspots 228.

Figure 10:
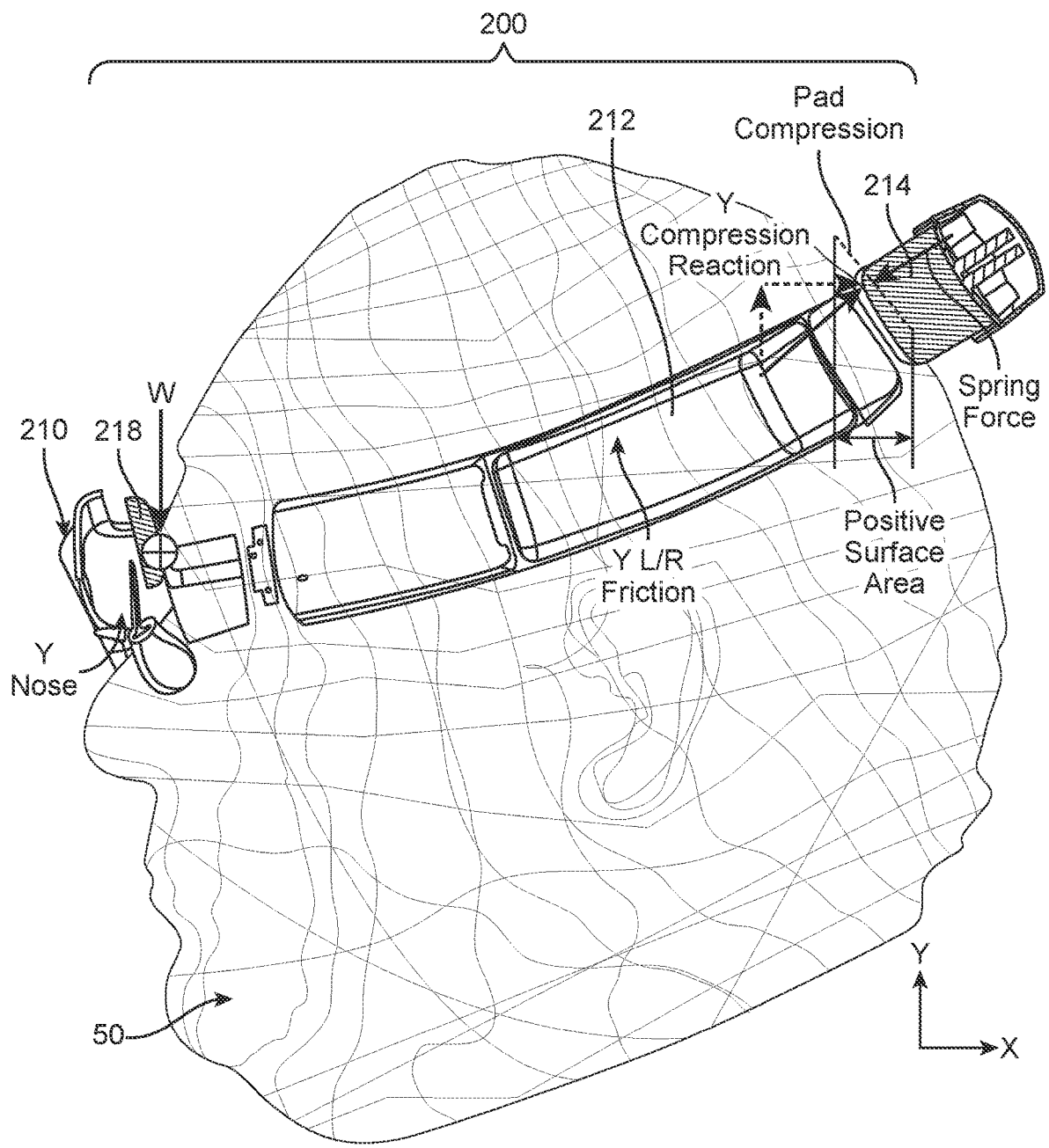

FIG. 10 depicts the various reactive forces supporting the weight "W" of the wearable 210 on the user's 50 head. The interaction of the wearable 210 and the nose pad generates a reactive force "Y Nose," which supports some of the weight "W." The friction generated by the left and right pads 212, 216 against the left and right sides of the user's 50 head (described below) generates another reactive force "Y L/R Friction," which supports some of the weight "W." The compression of the rear pad 214 generates a "Spring Force," which is equal to still another reactive force "Y Compression Reaction." This "Y Compression Reaction" reactive force also supports some of the weight "W" of the wearable 210. The "Y Compression Reaction" reactive force results from an approximately 10° tilt of the wearable 210 so that the rear pad 214 is above the front pad 218.

Figure 11:
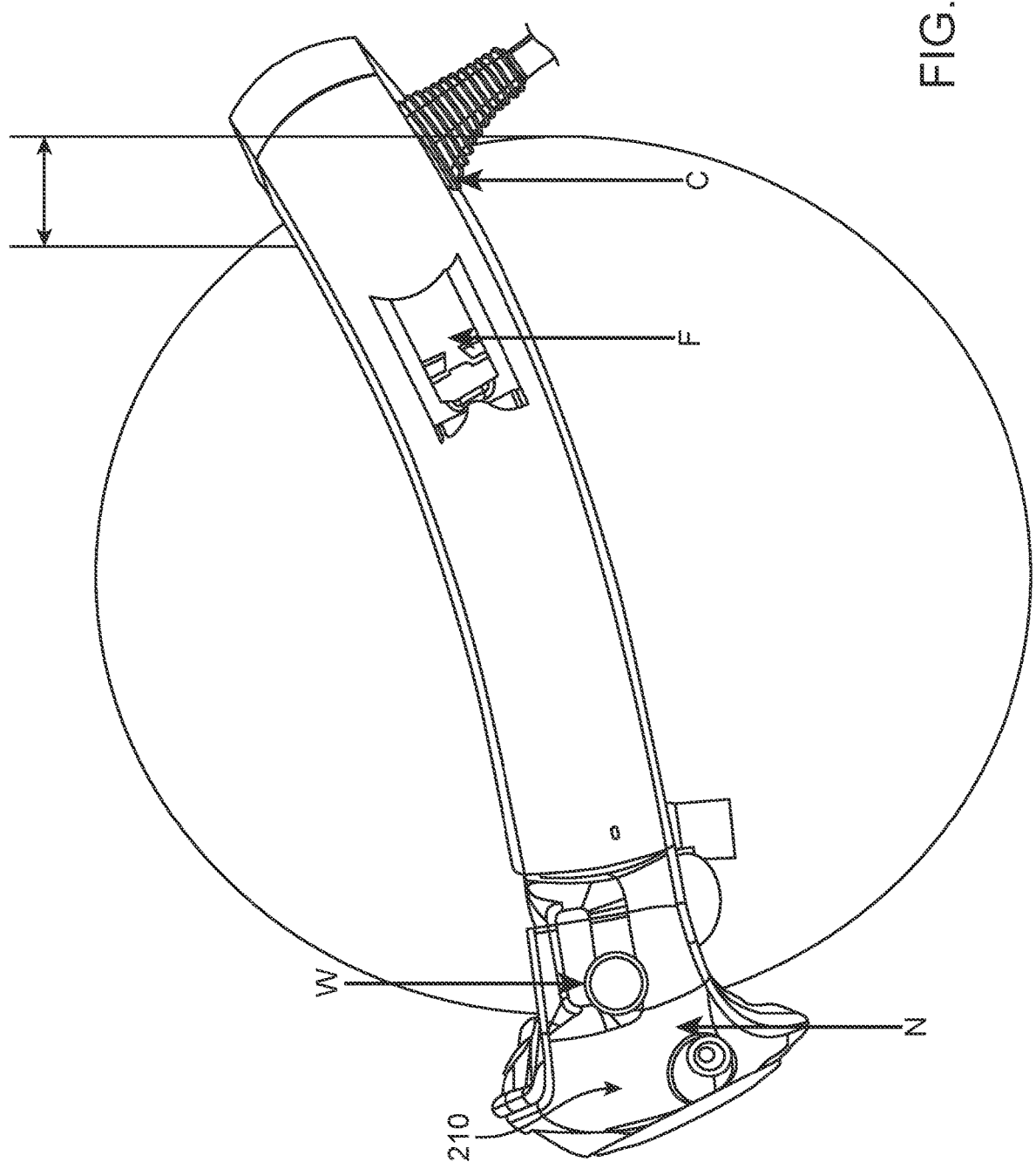

FIG. 11 is a free body diagram depicting the various forces (reactive and weight "W") depicted in FIG. 10. FIG. 11 shows that the weight W of the wearable 210 is supported/offset by various reactive forces, including the nose pad reactive force N, the frictional reactive force F from the left and right pads 212, 216, and the compressive reactive force C from the rear pad 214.

Figure 12:
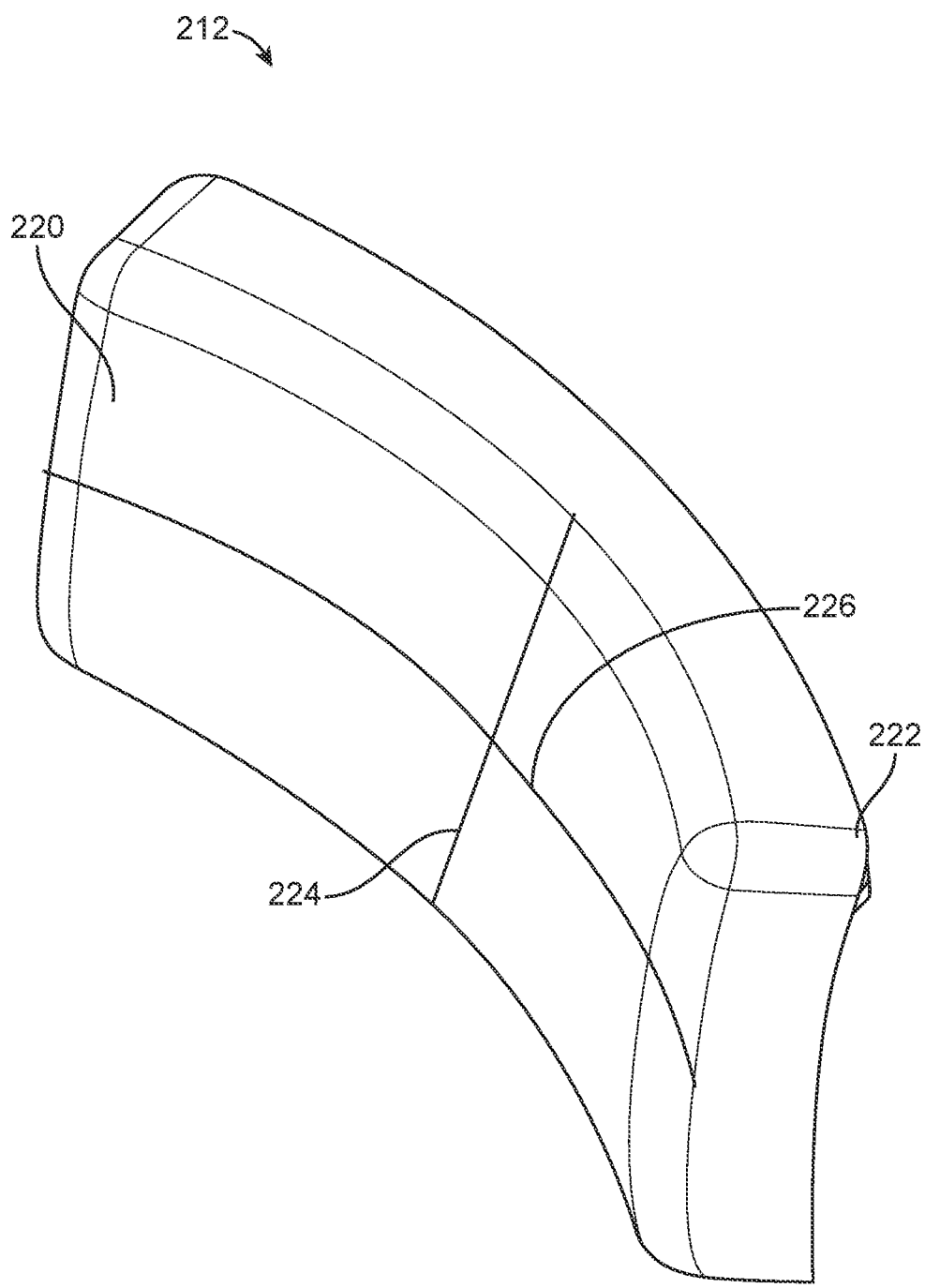
FIG. 12 depicts a left pad of contact modulating systems usable with VR/AR/MR systems, according to some embodiments.

FIG. 12 depicts a left pad 212 according to one embodiment. The left pad 212 has an interior side 220 (i.e., facing toward the user), and an exterior side 222 (i.e., facing away from the user and toward the wearable (not shown, see 210 in FIG. 7)). The left pad 212 also has a first axis 224 and a second axis 226 that are substantially orthogonal to each other.

Figure 26:
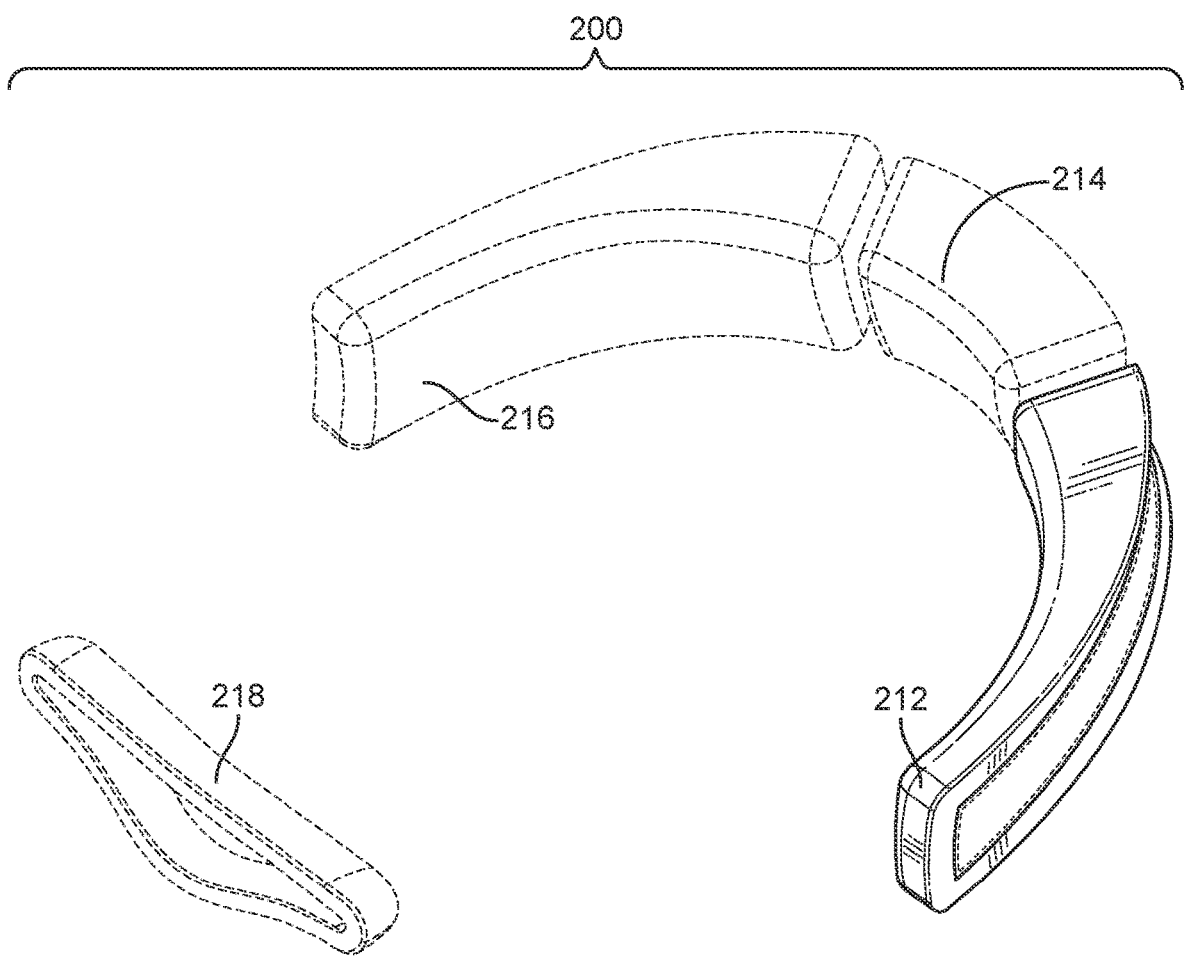
FIGS. 26 to 33 depict a left pad of contact modulating systems usable with VR/AR/MR systems from various views, according to some embodiments.
Figure 27:
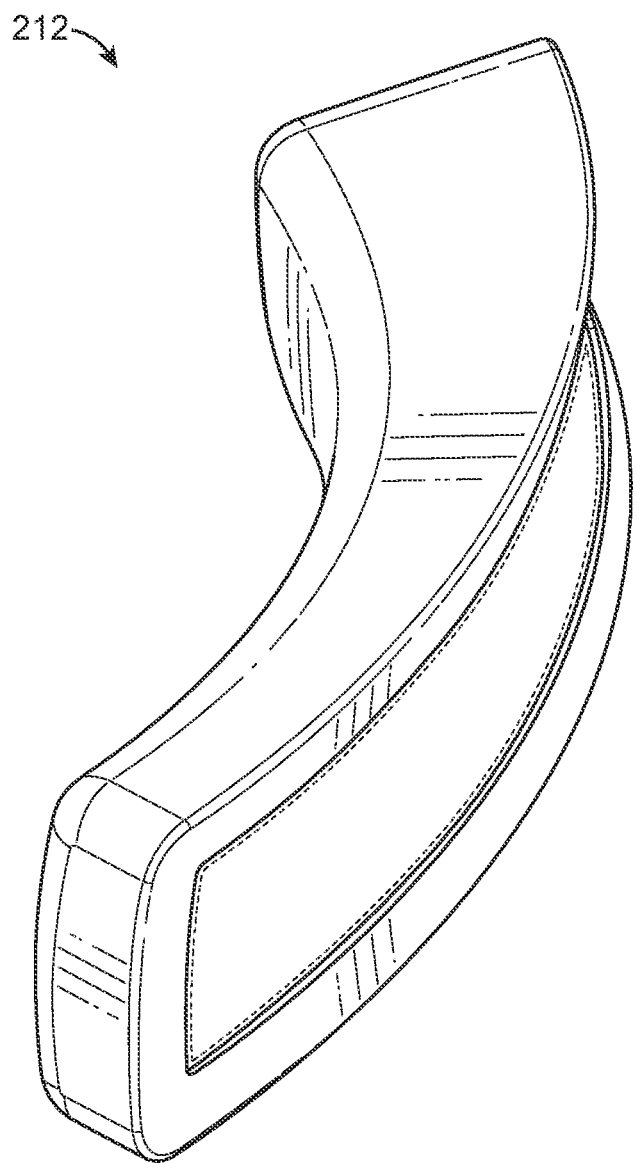
Figure 28:
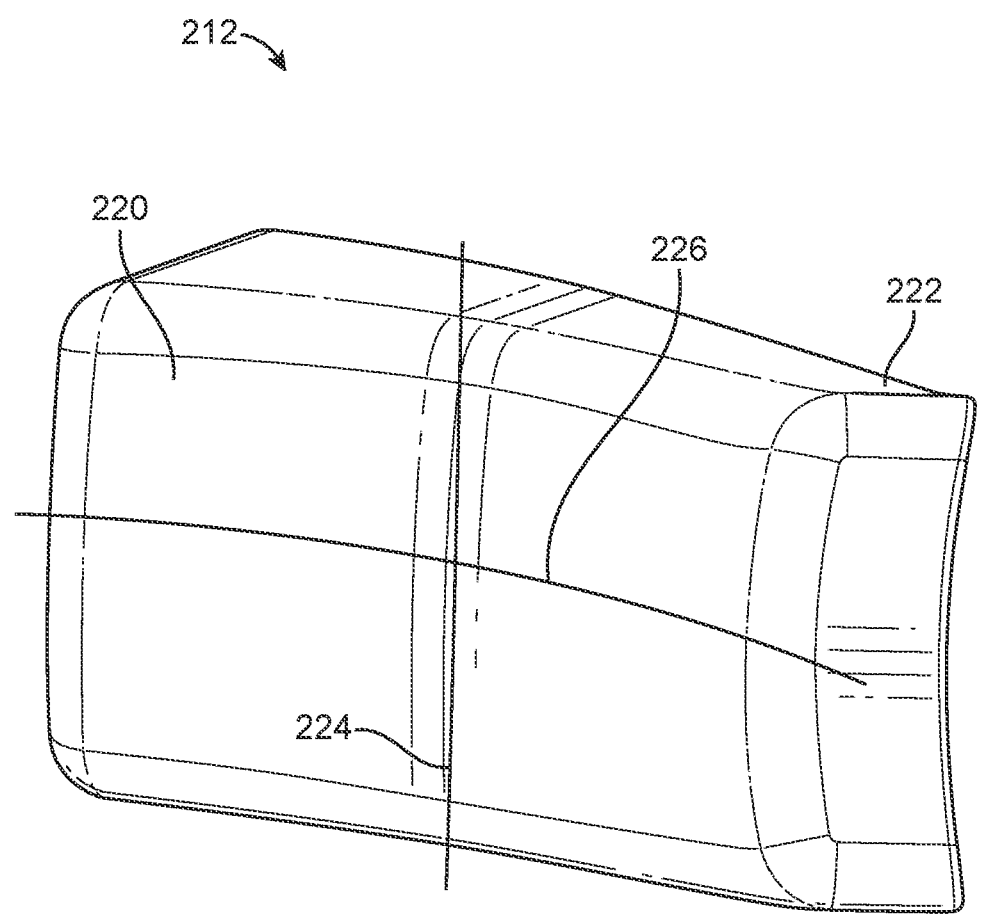
Figure 29:
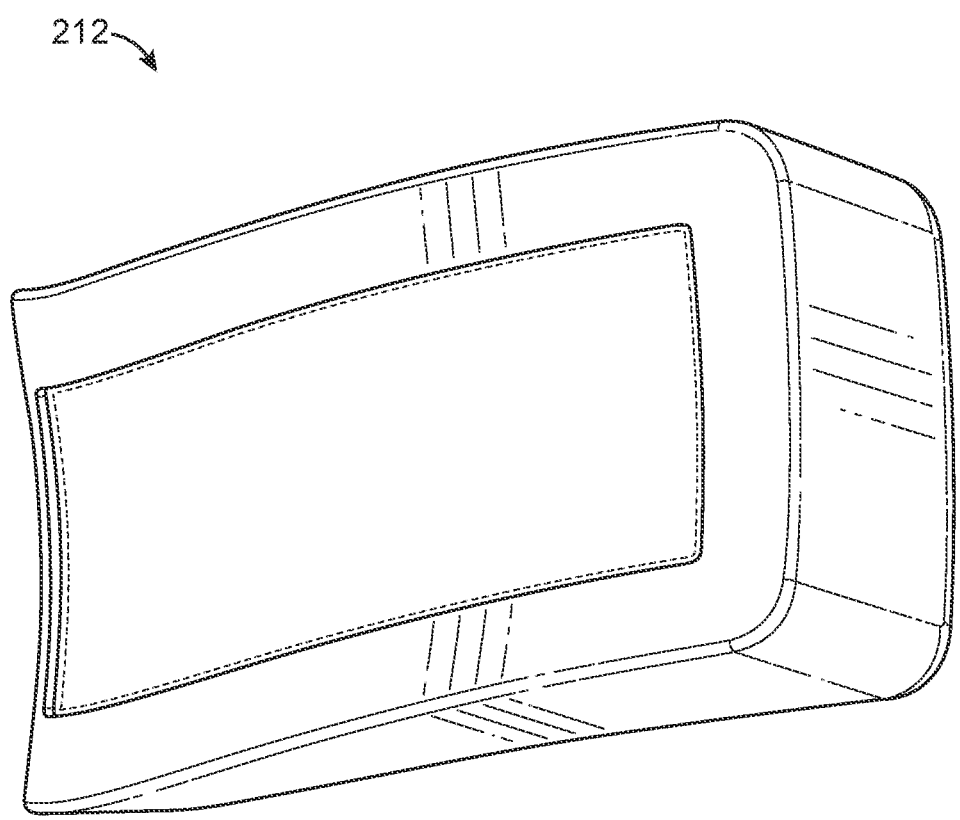
Figure 30:
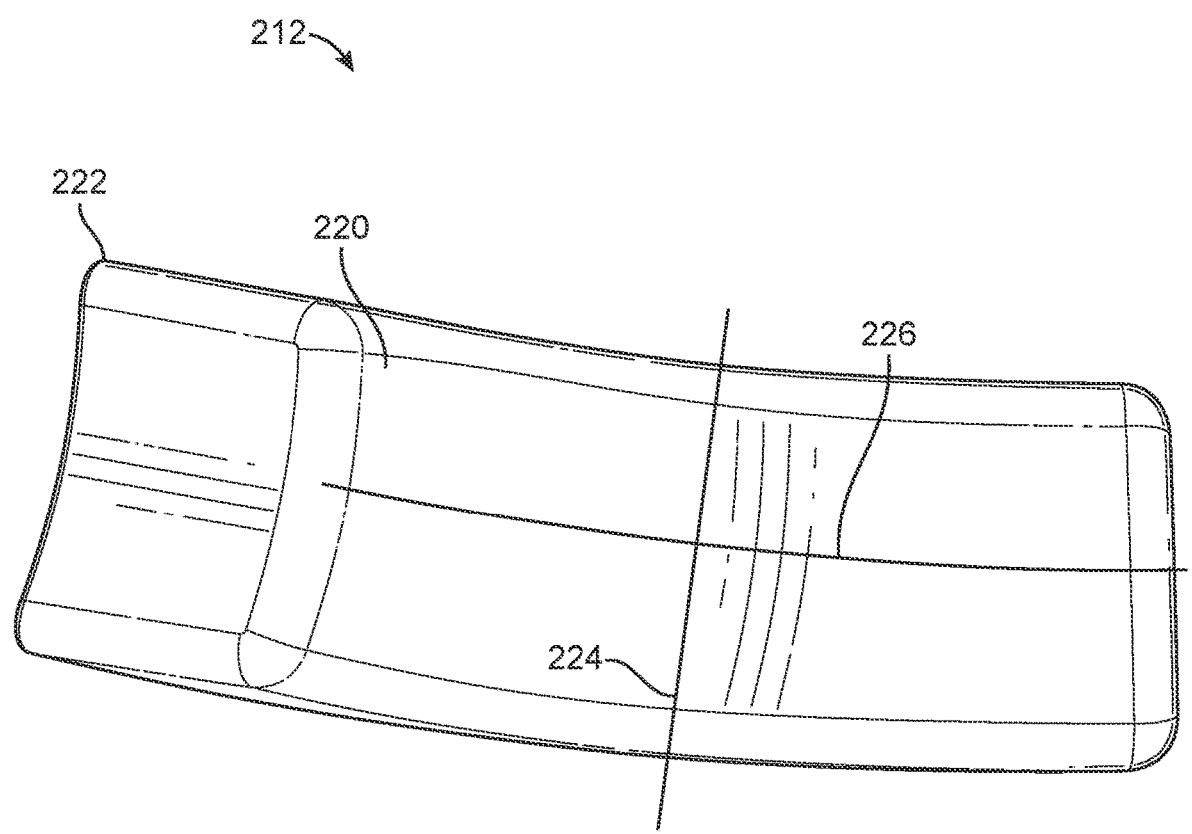
Figure 31:
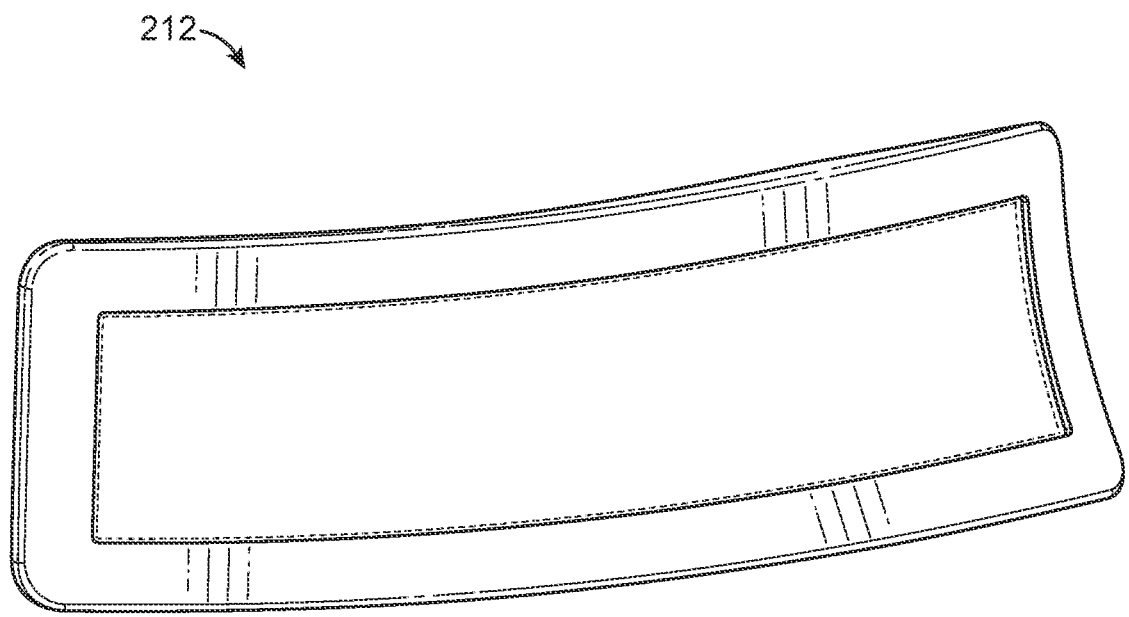
Figure 32:
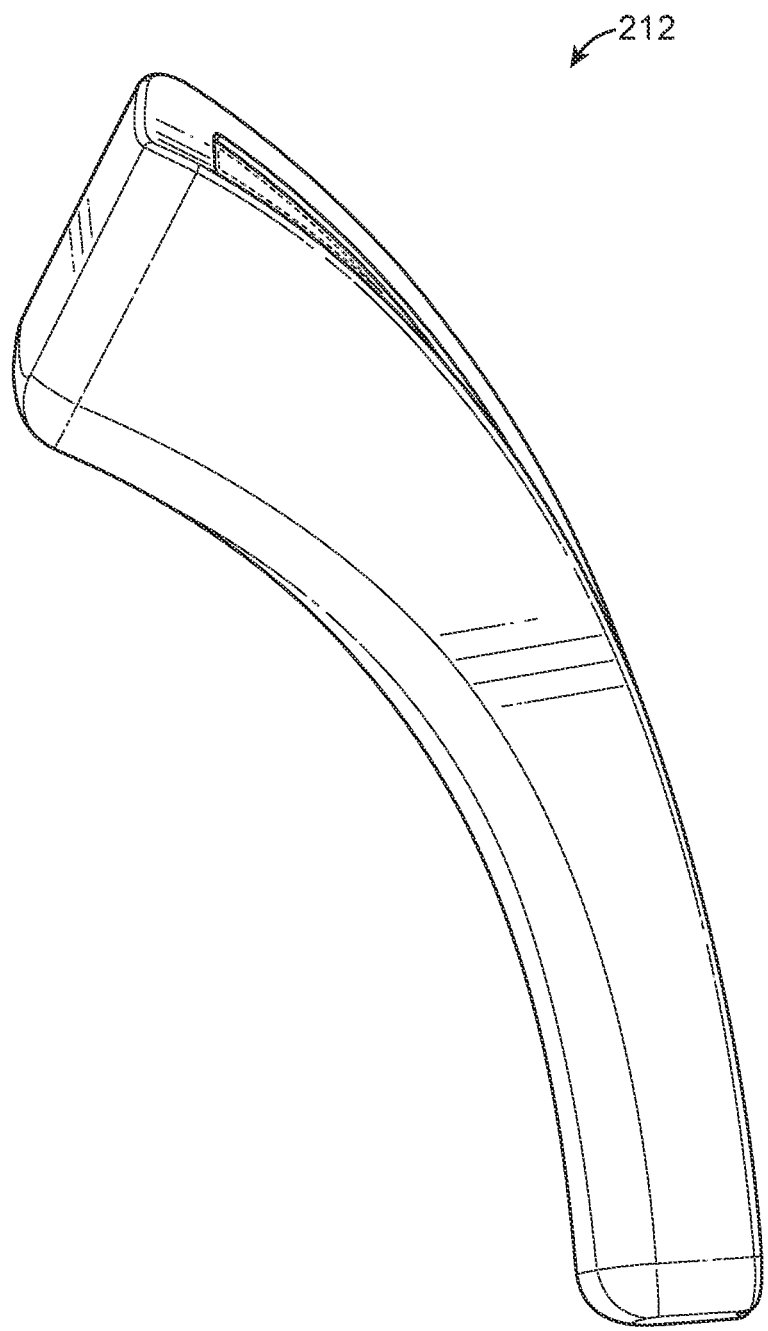
Figure 33:
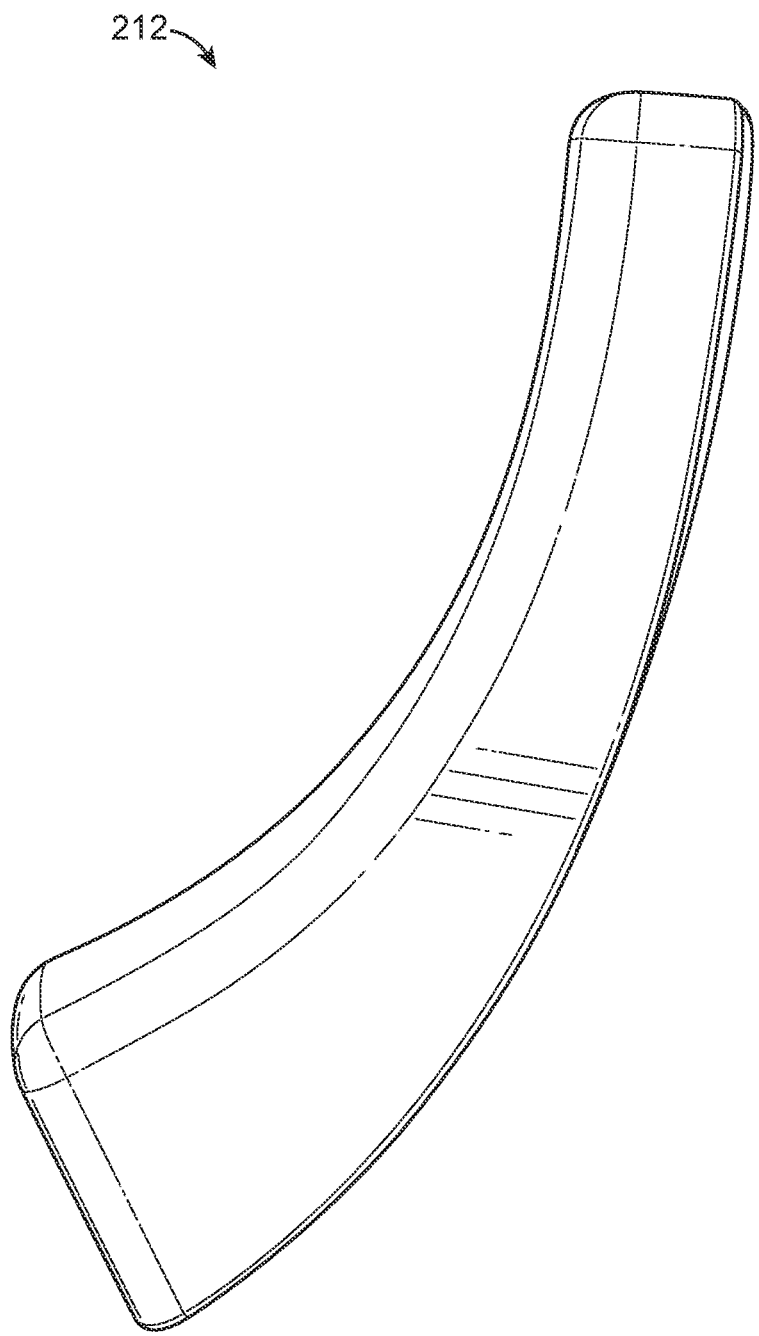
Figure 34:
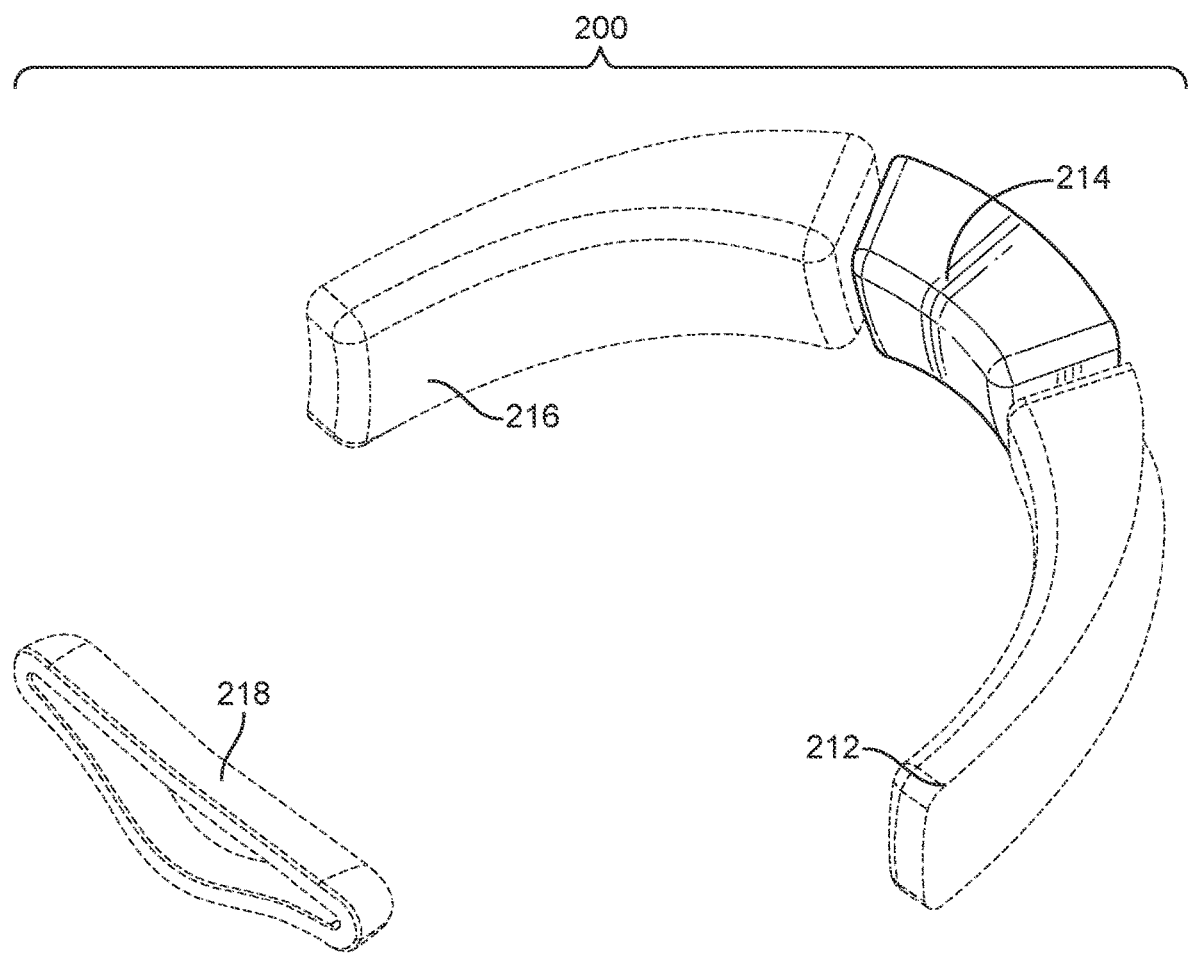
FIGS. 34 to 41 depict a rear pad of contact modulating systems usable with VR/AR/MR systems from various views, according to some embodiments.
Figure 35:
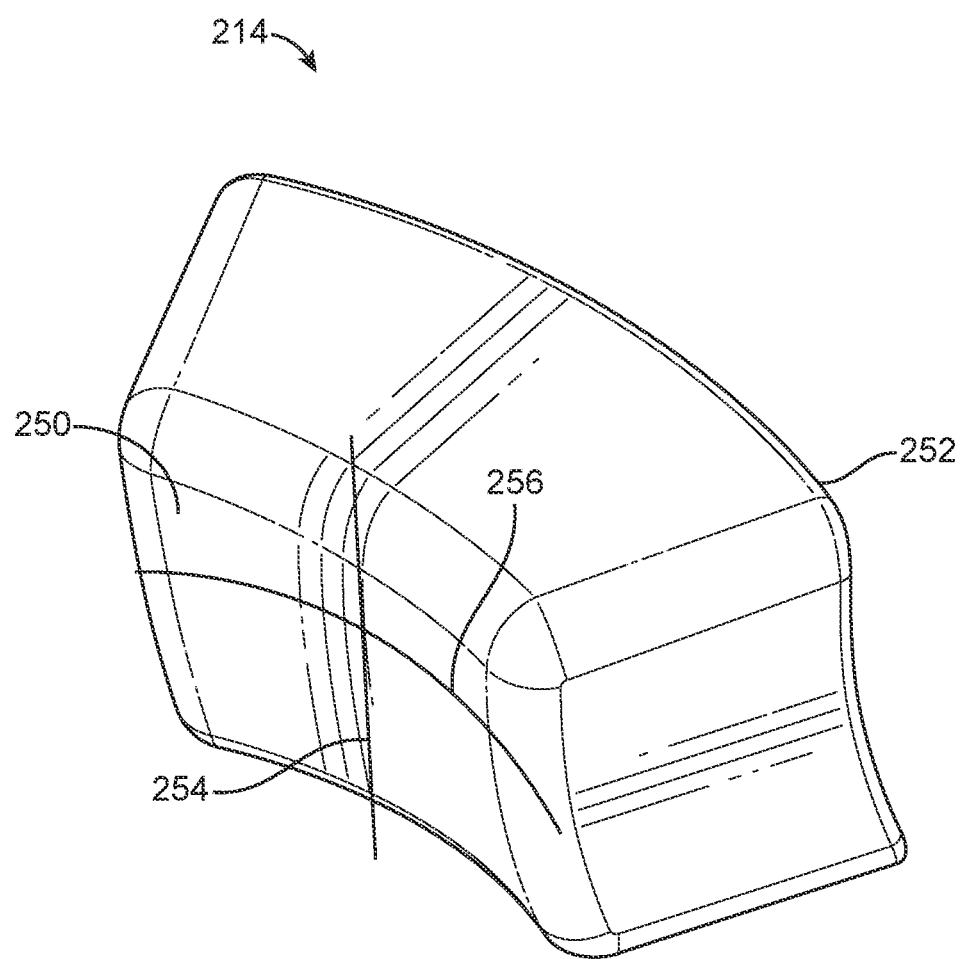
Figure 36:
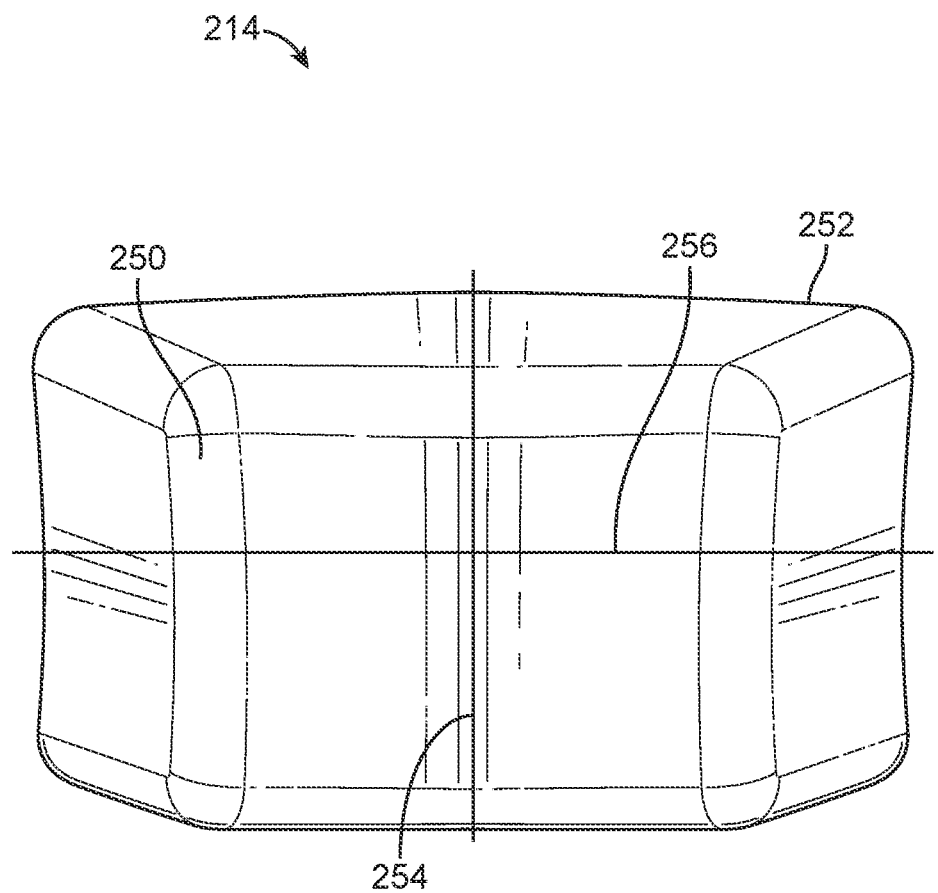
Figure 37:
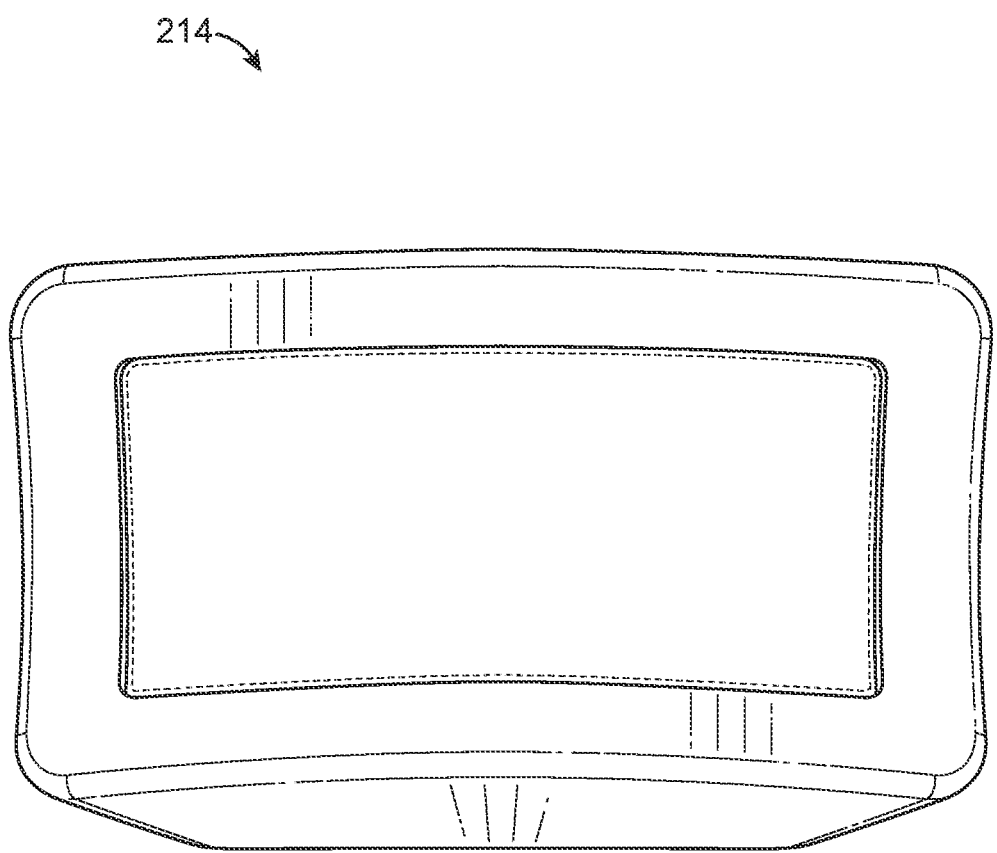
Figure 38:
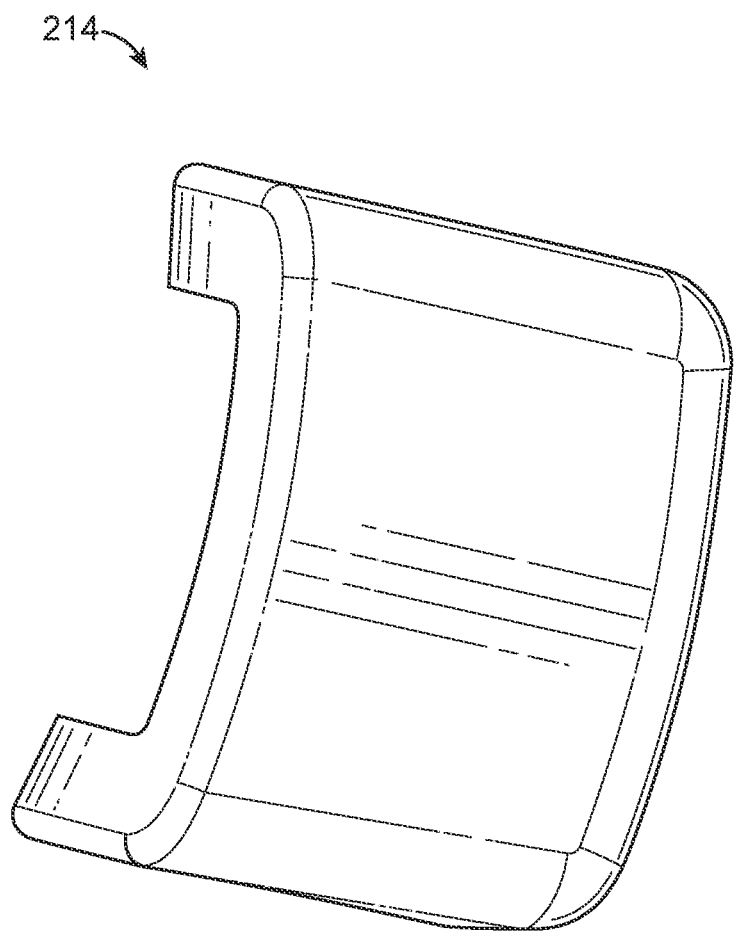
Figure 39:
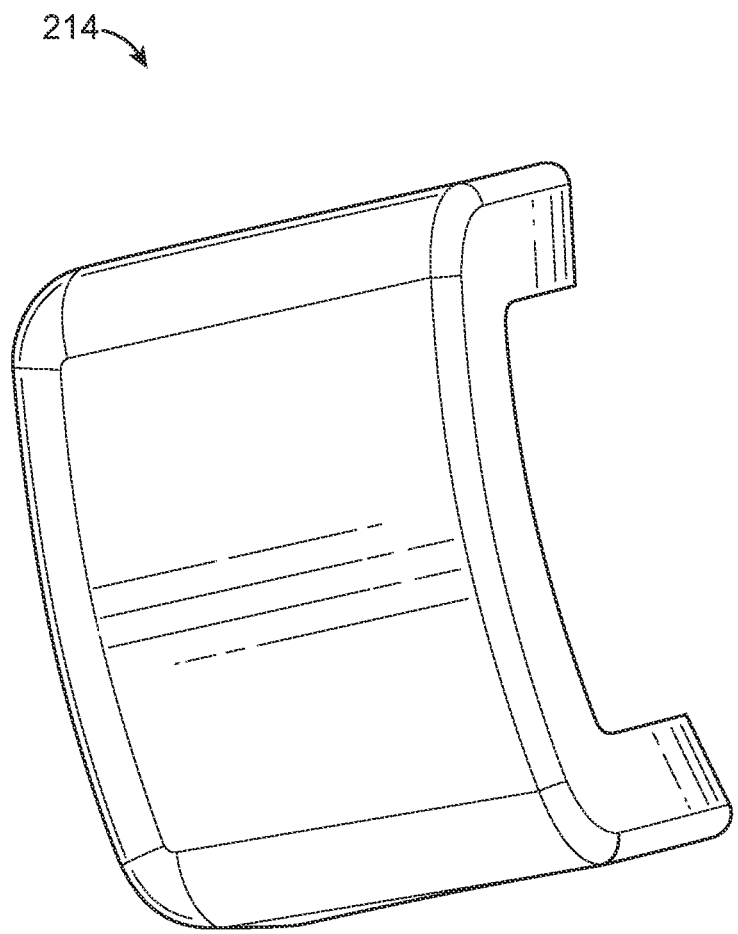
Figure 40:
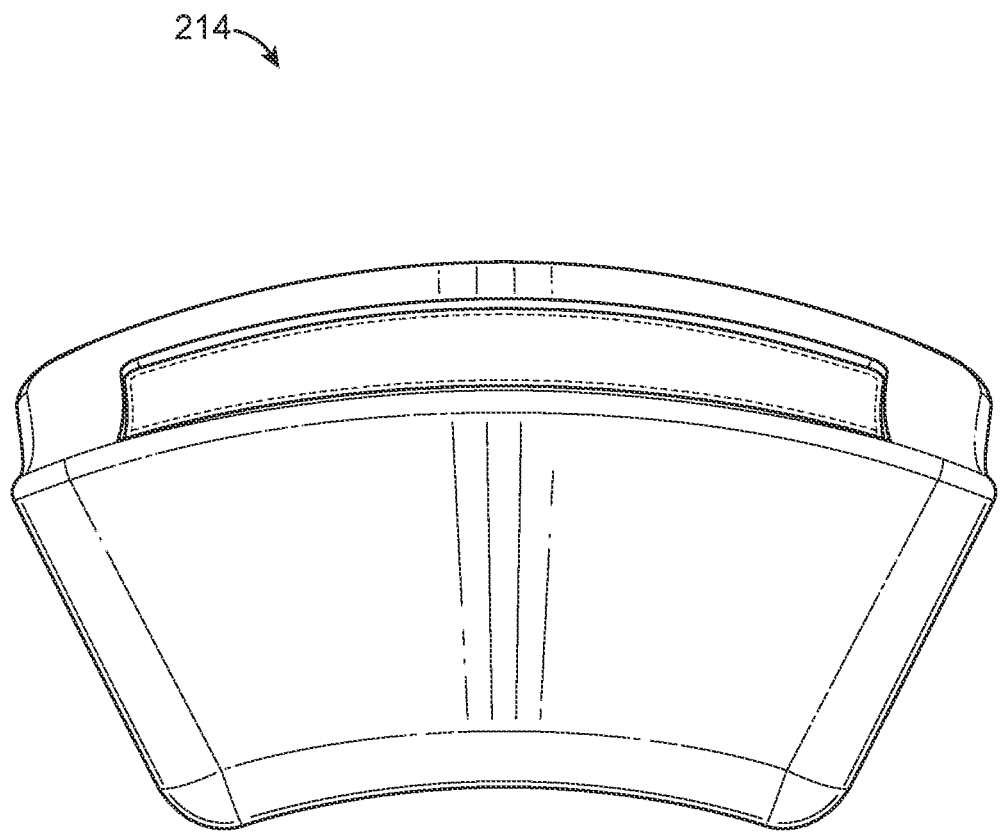
Figure 41:
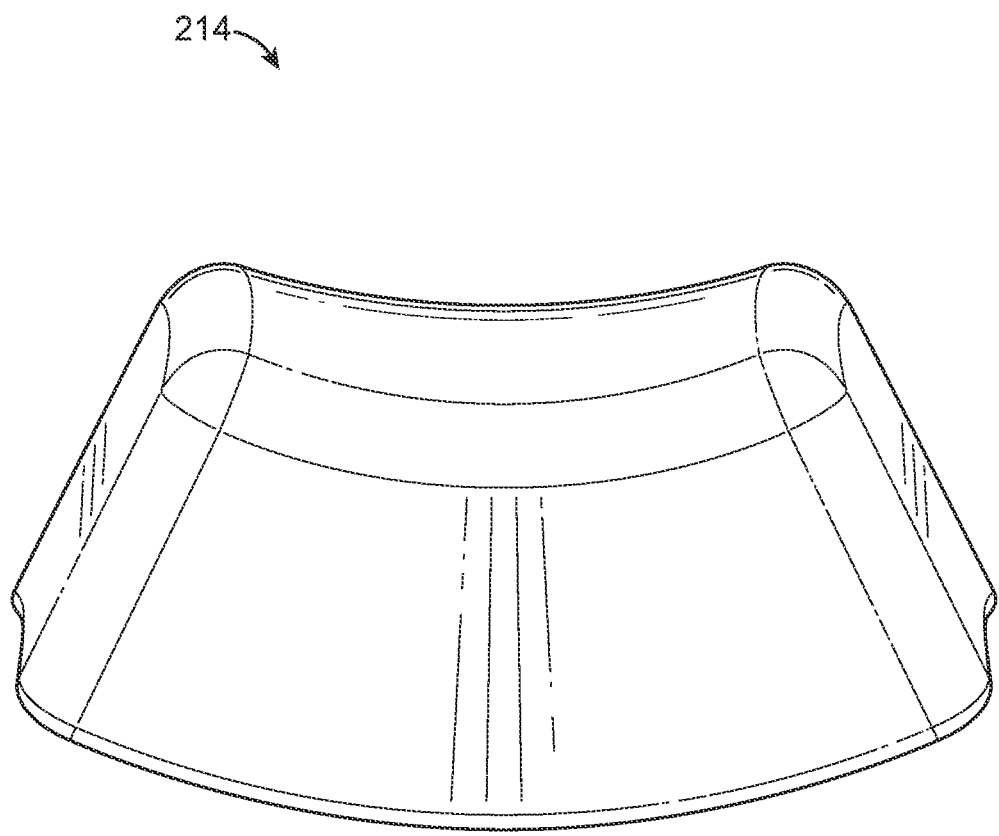
Figure 42:
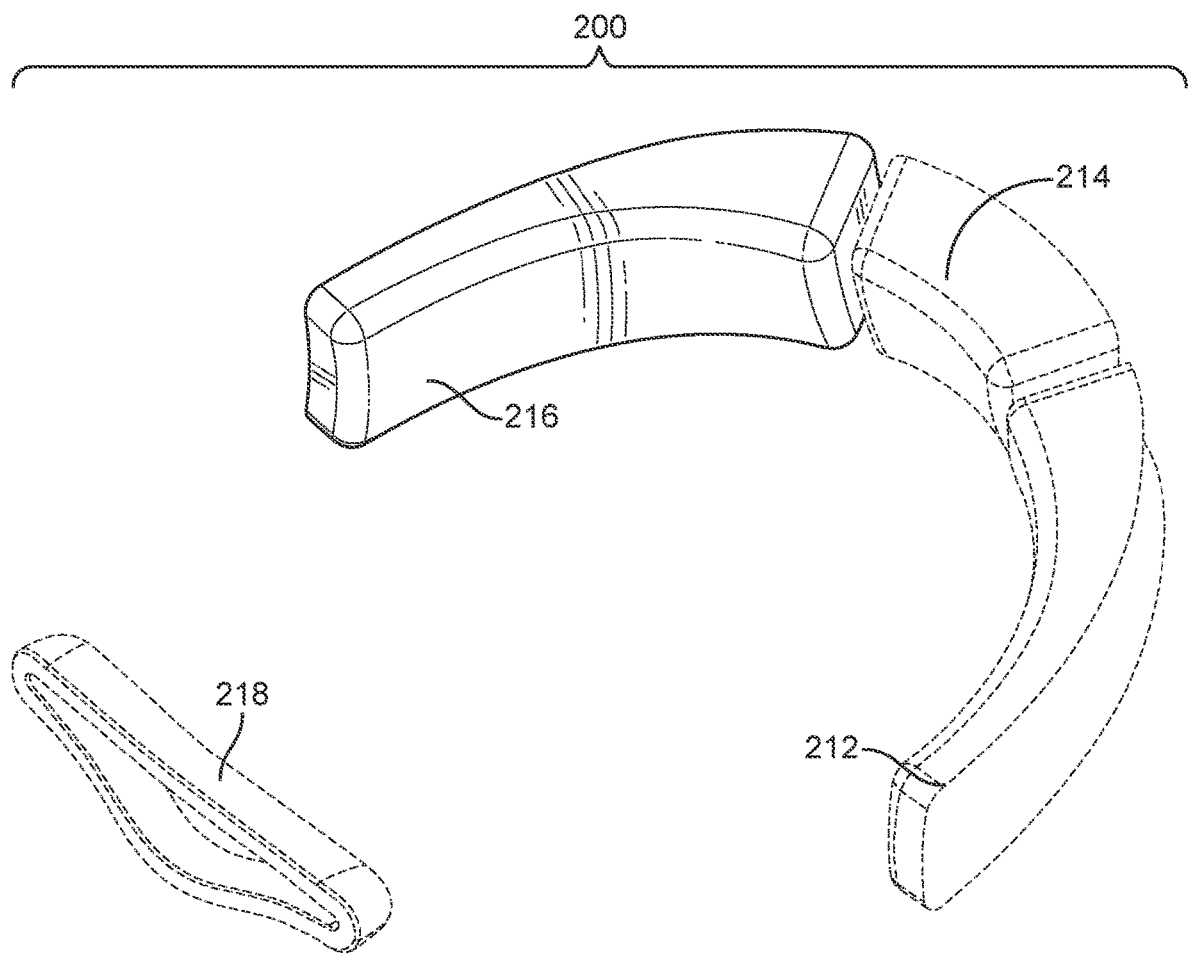
FIGS. 42 to 49 depict a right pad of contact modulating systems usable with VR/AR/MR systems from various views, according to some embodiments.
Figure 43:
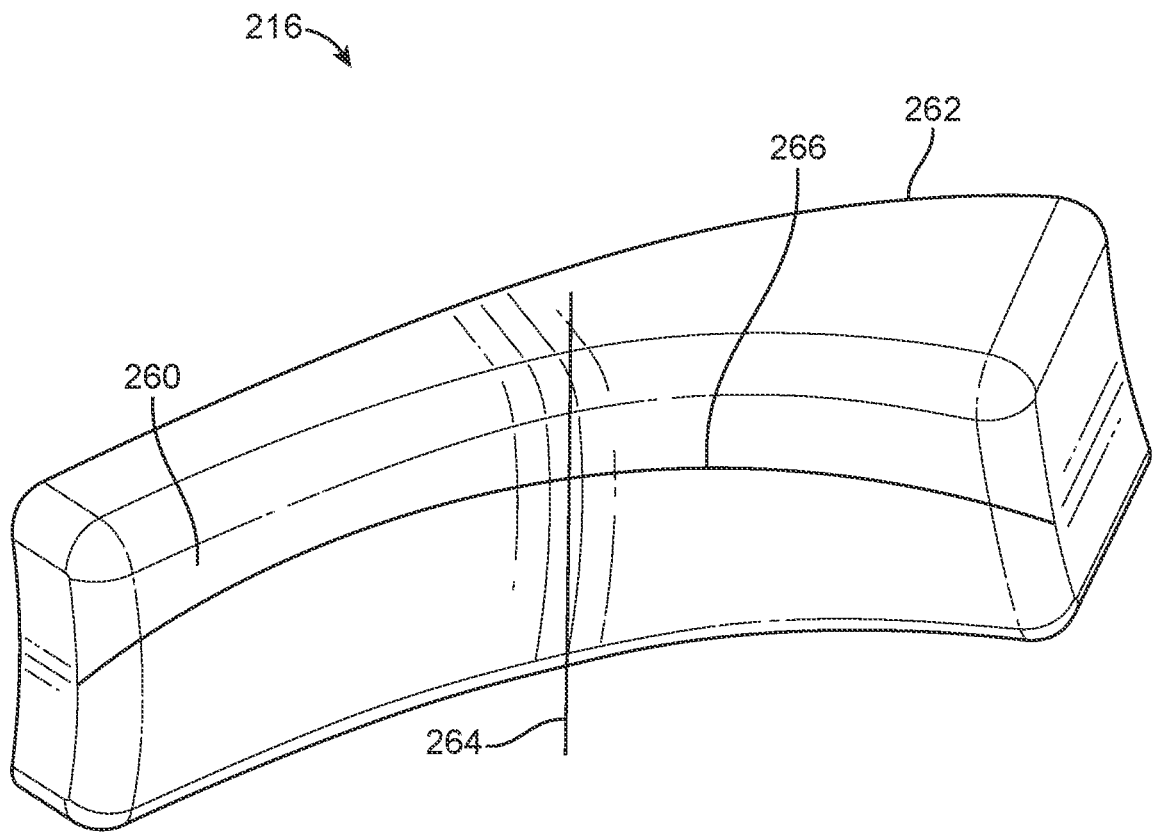
Figure 44:
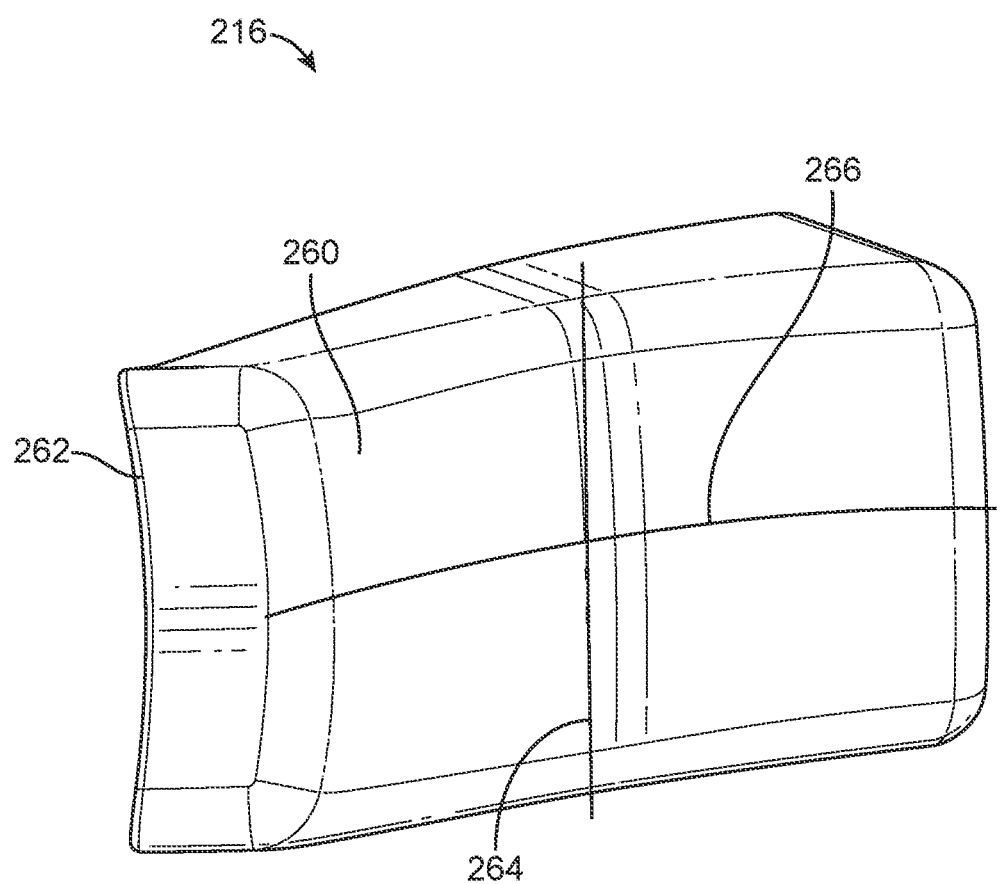
Figure 45:
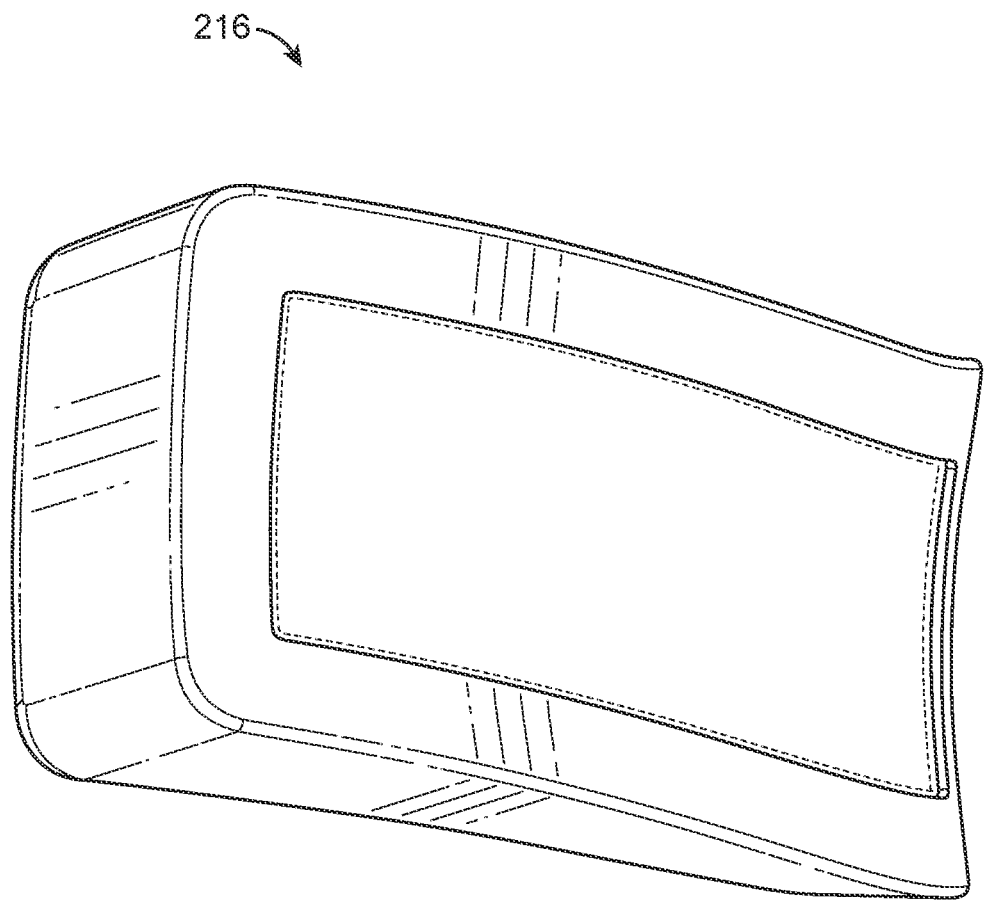
Figure 46:
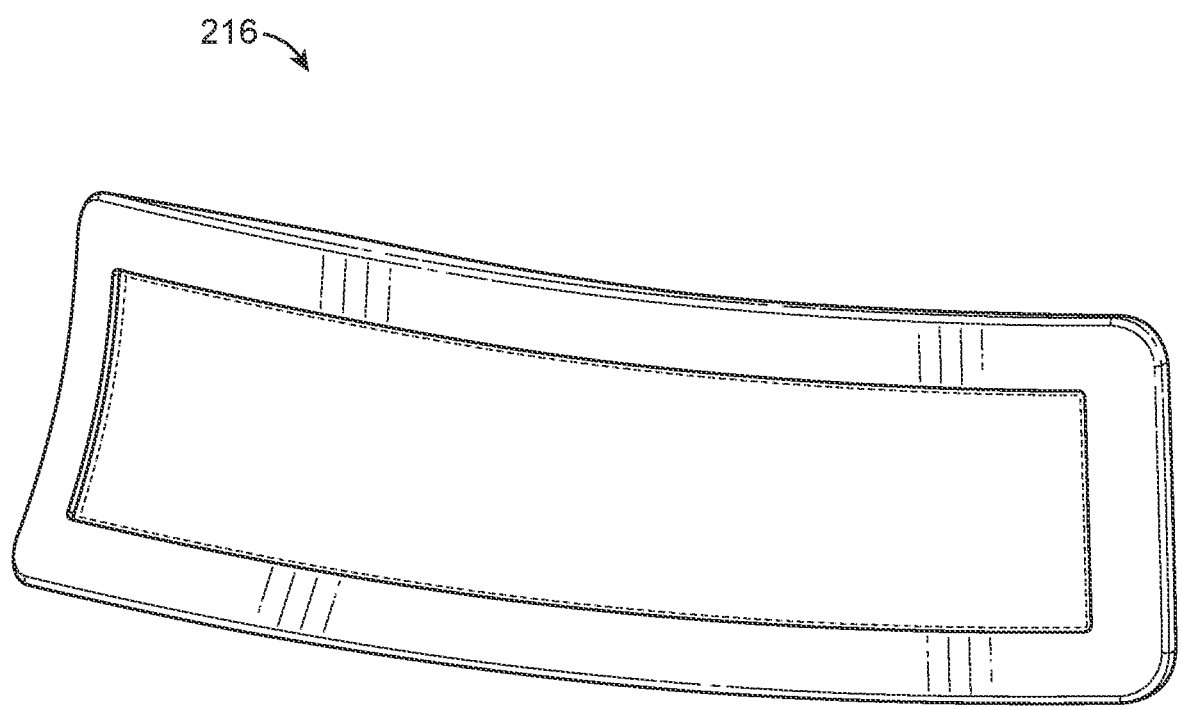
Figure 47:
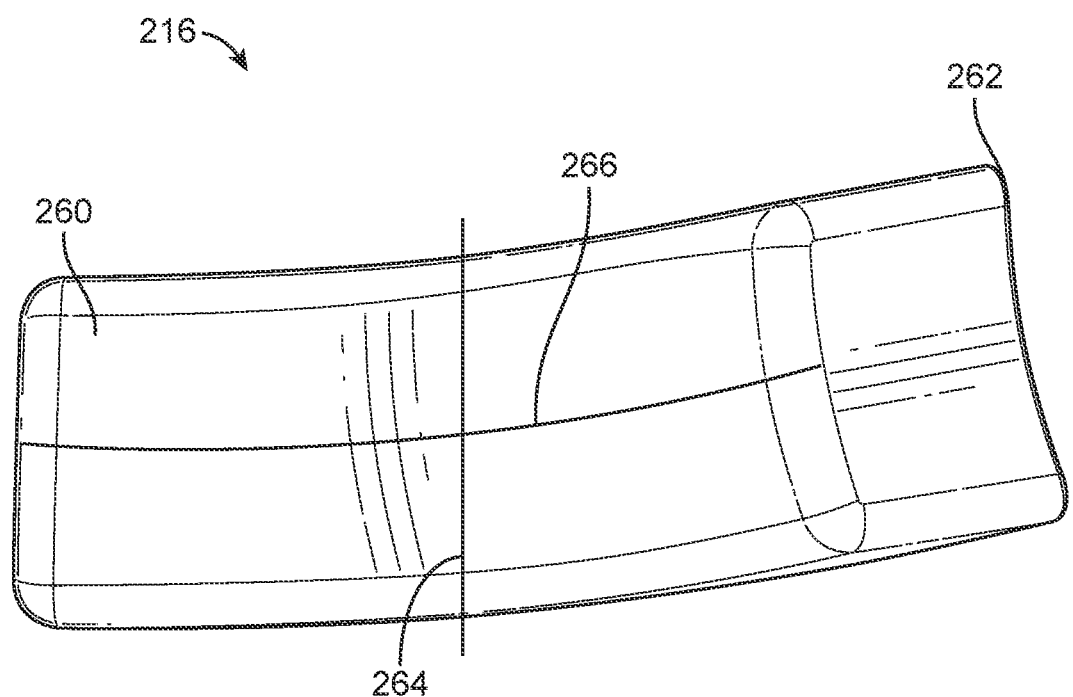
Figure 48:
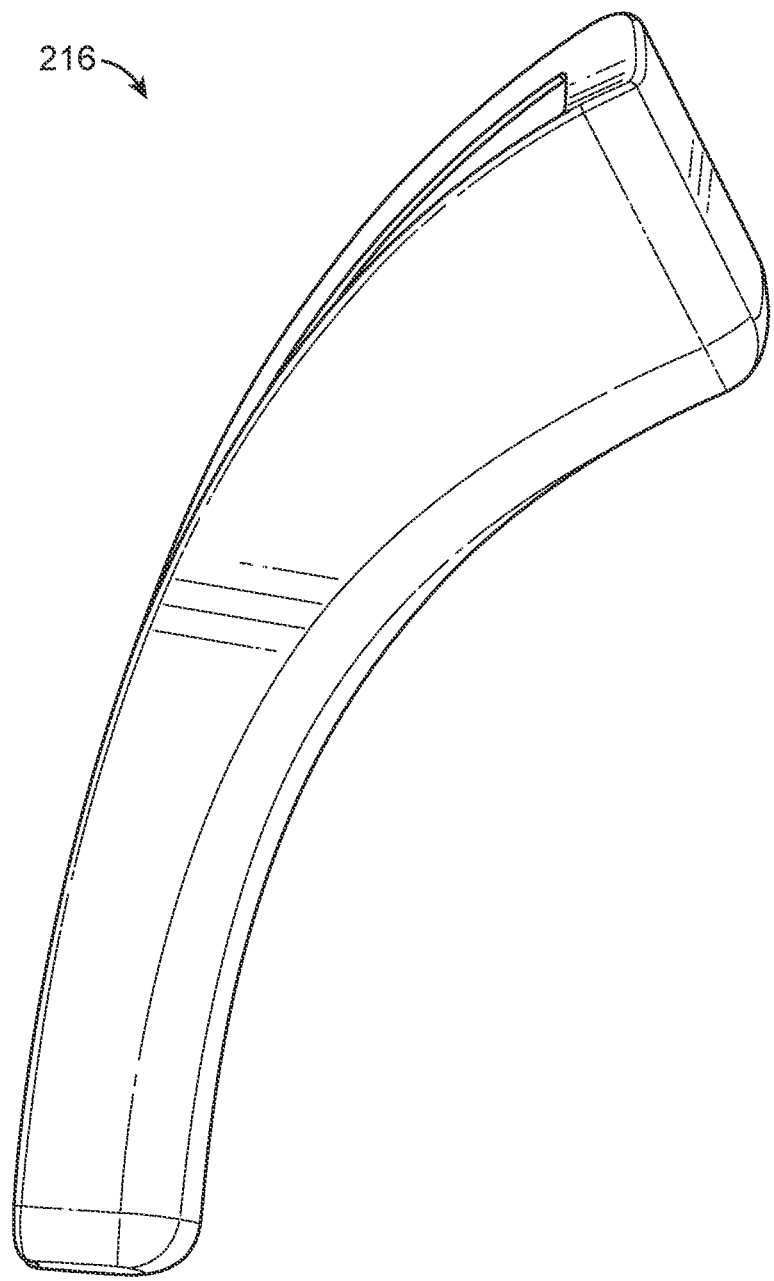
Figure 49:
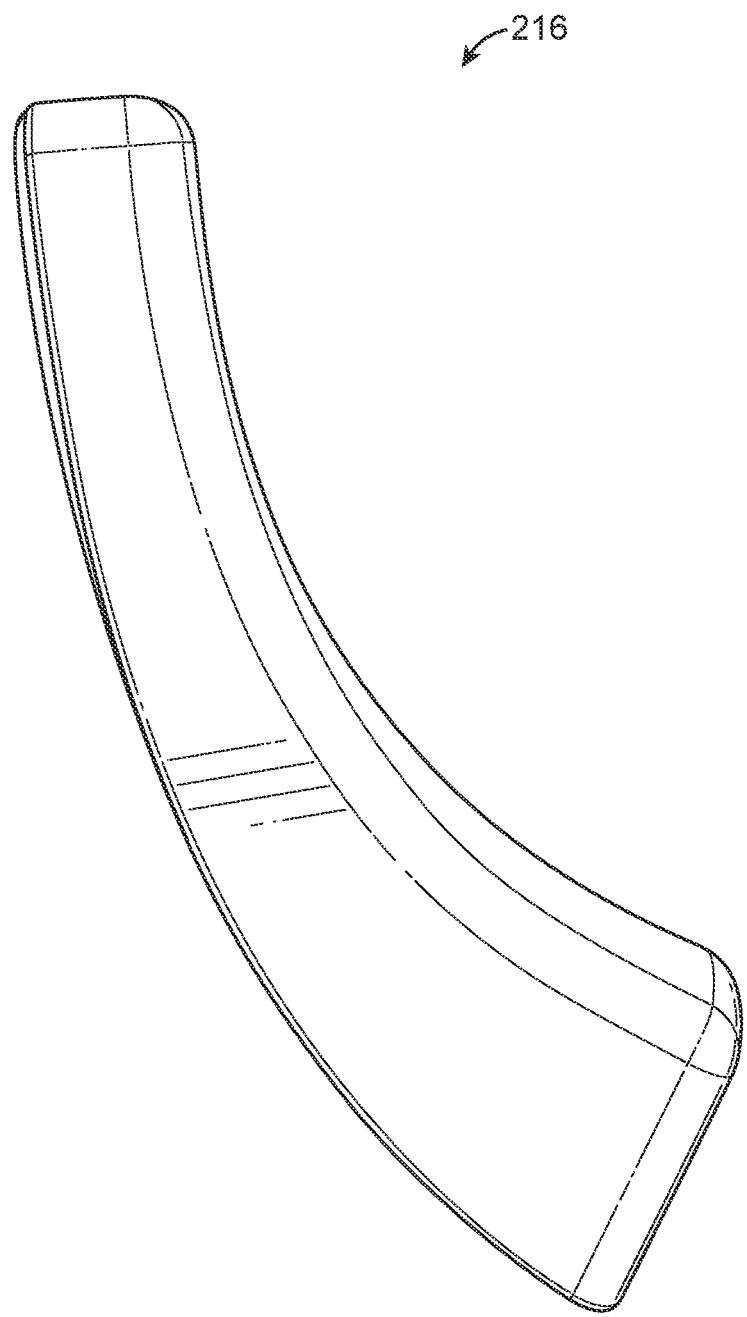
Figure 50:
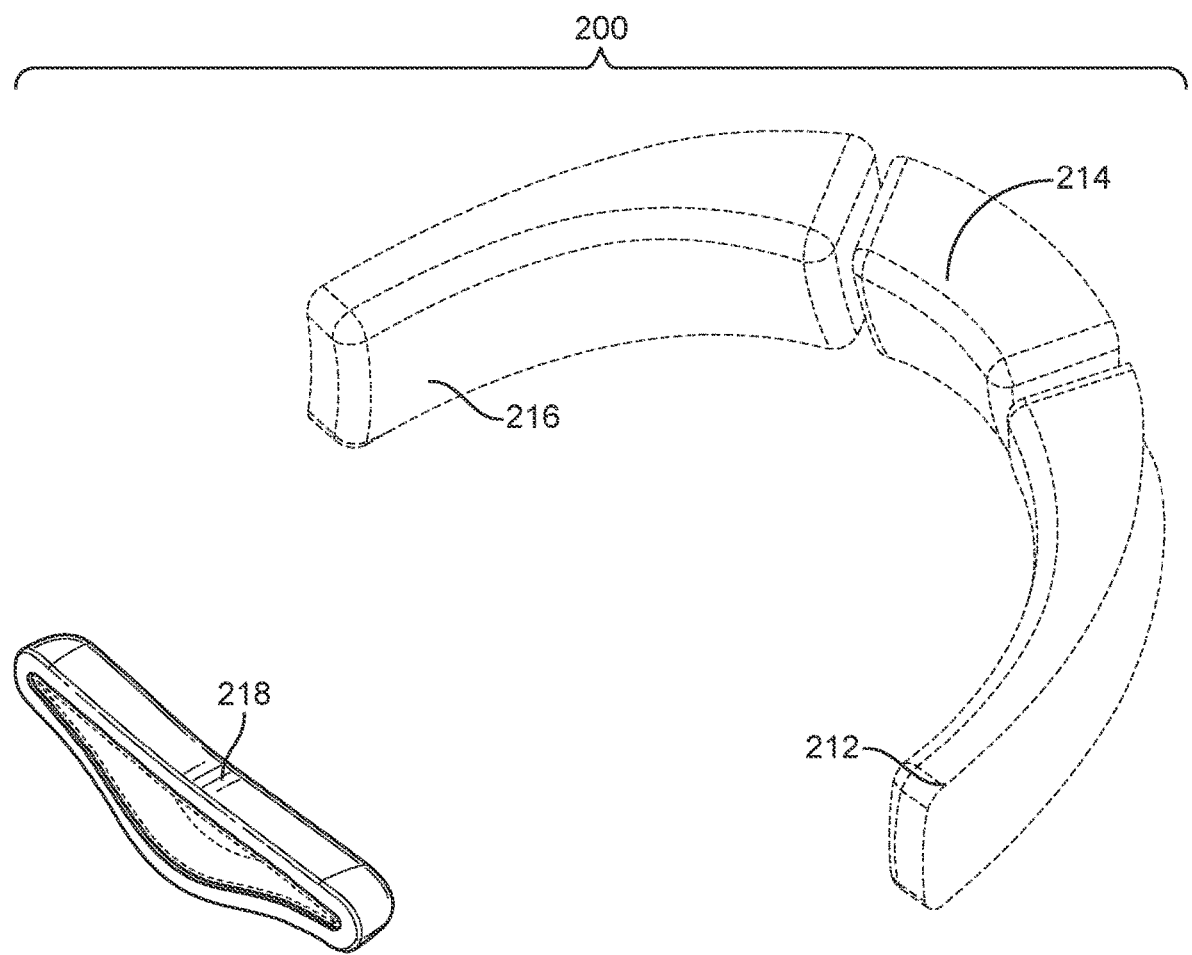
FIGS. 50 to 57 depict a front pad of contact modulating systems usable with VR/AR/MR systems from various views, according to some embodiments.
Figure 51:
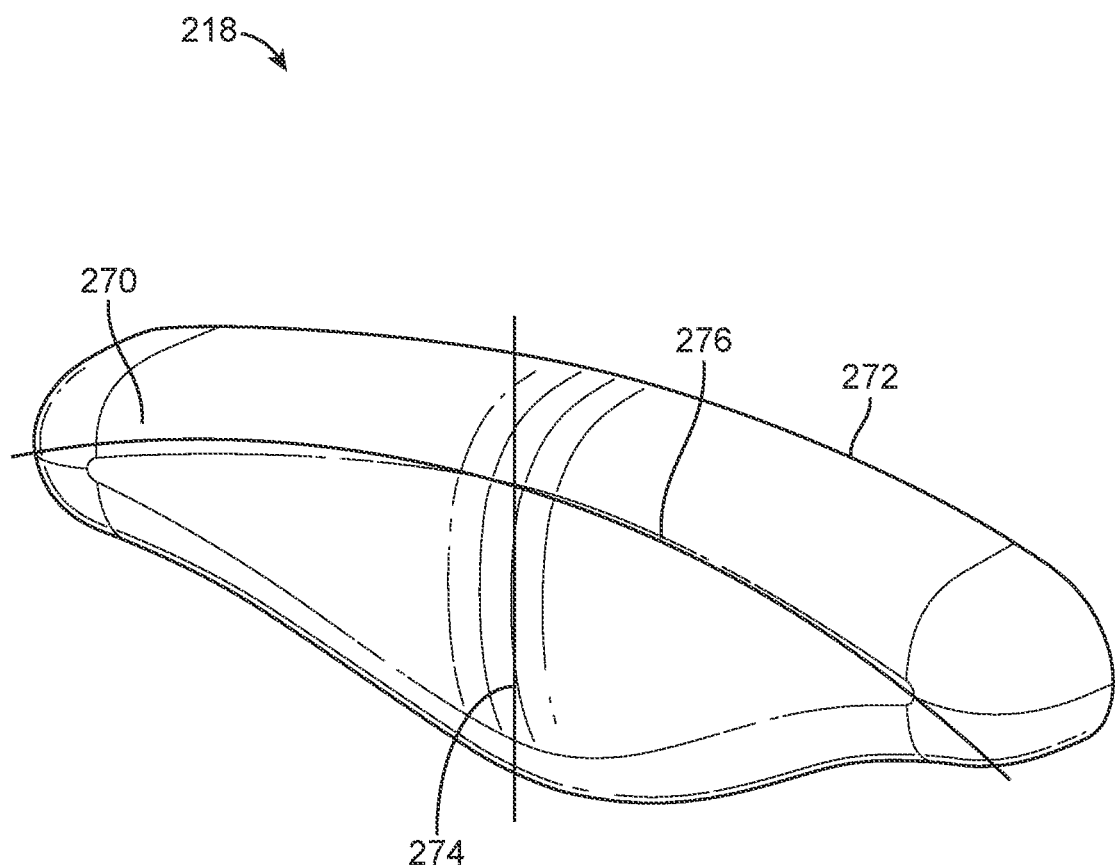
Figure 52:
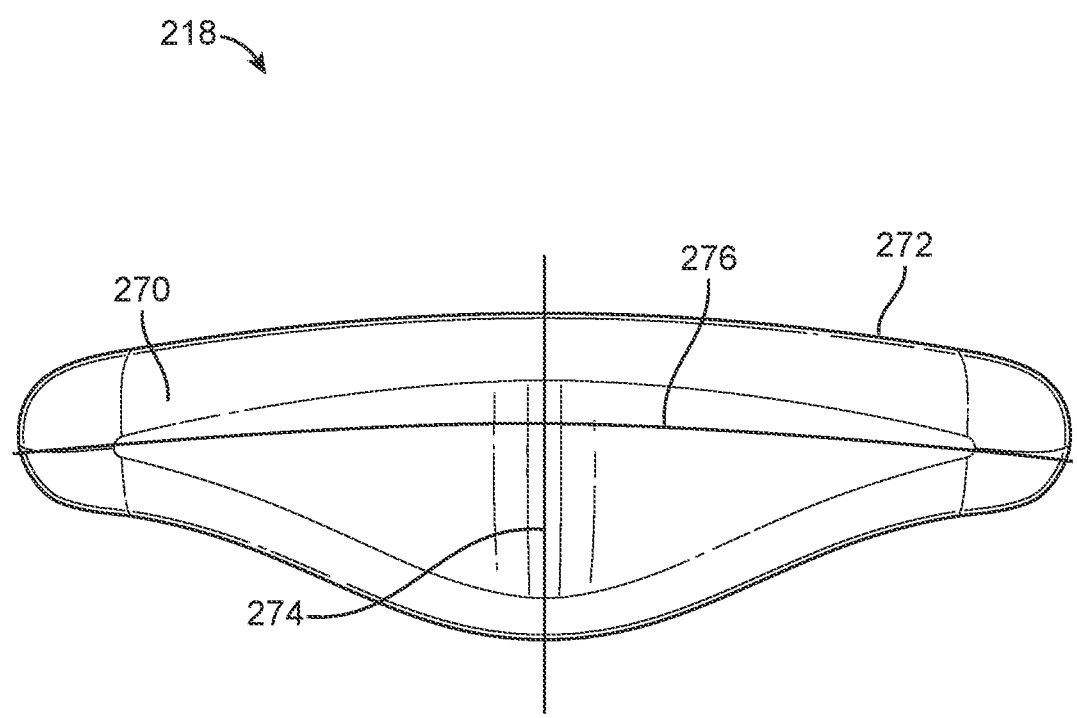
Figure 53:
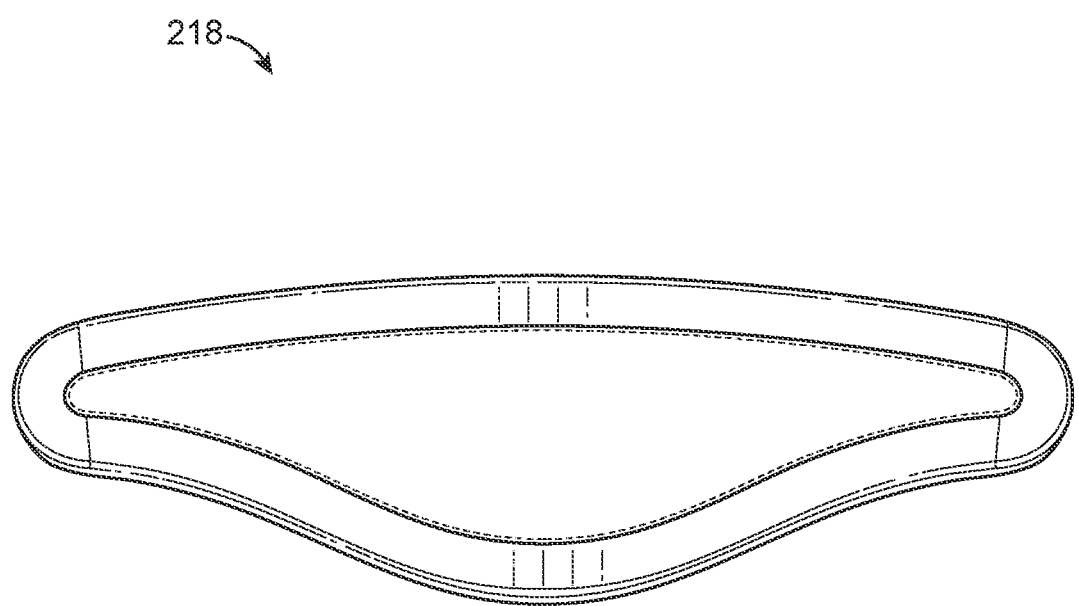
Figure 54:
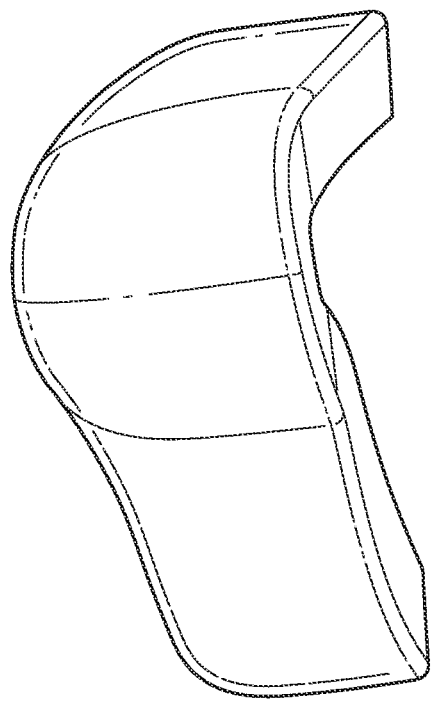
Figure 55:
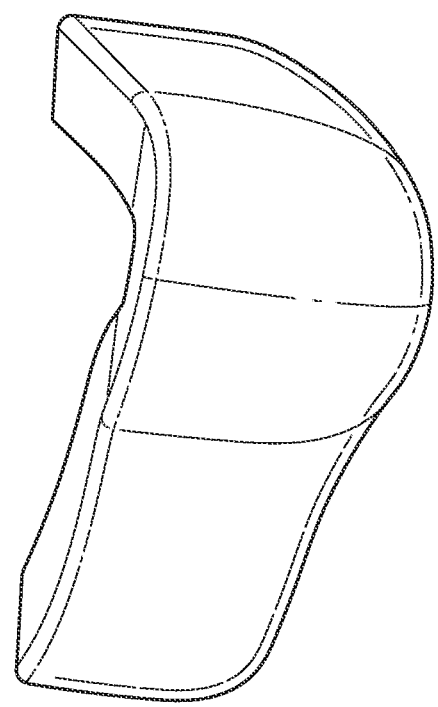
Figure 56:
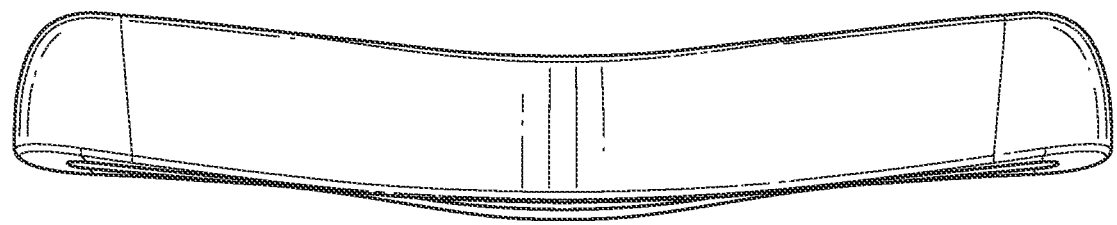
Figure 57:
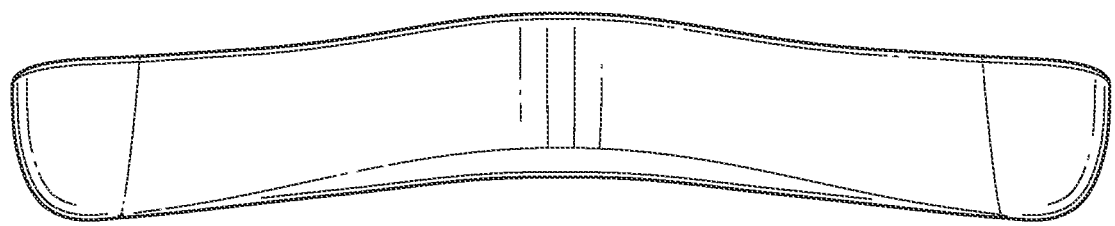

The left pad 212 is substantially concave about the first axis 224, and is therefore configured to approximate the shape of a typical user's head (i.e., approximately around an offset circumference of the user's head). The concavity about the first axis 224 allows the left pad 212 to support the wearable 210 evenly across all points along the second axis 226. The left pad 212 is substantially convex about the second axis 226. The convex shape creates a tangential relationship between the resultant force (see frictional reactive force F in FIG. 11) and the second axis 226 when the left pad 212 contacts the user's head. This design is the opposite of existing pads that are designed to maximize contact with the user's head by approximating the contours of the user's head so that even pressure is applied over the entire pad. The shape of each of the pads in the padding system 200 (see e.g., FIG. 26) is configured to increase user comfort when wearing the audio-visual display system/wearable 210.

Figure 13A:
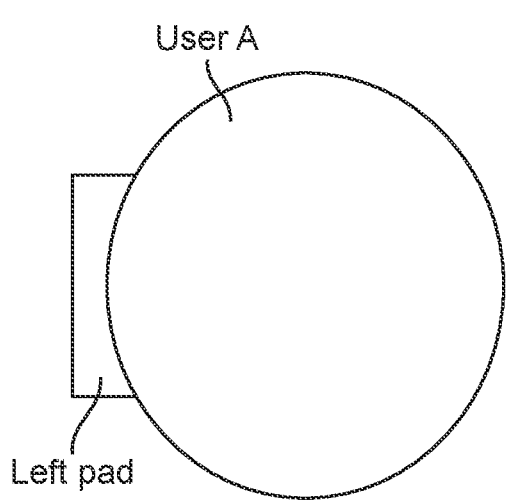
FIGS. 13a-13d depict different pad shape configurations on users having different head shapes in coronal cross-sectional views, according to some embodiments.
Figure 13B:
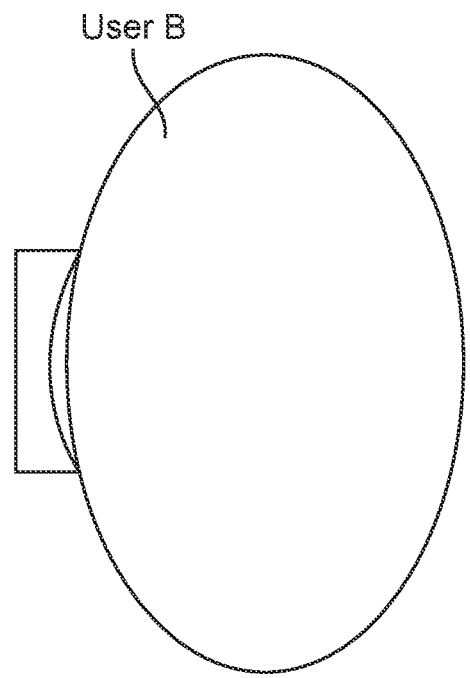

FIGS. 13a-13d illustrate different pad shape configurations on User A and User B having different head shapes in coronal cross-sectional views. FIG. 13a shows a left pad designed for User A's head shape being worn by User A. The interface surface of the left pad corresponds to the shape of User A's head so that force is evenly distributed over the area of the pad for optimal comfort. However, if the same pad is worn by User B (FIG. 13b), the interface surface does not match the contour of User B's head and force may be applied over a very small area. This pad shape can result in pressure hotspots for User B, and thus, the pad of FIGS. 13a-13b does not accommodate a wide range of head shapes.

Figure 13C:
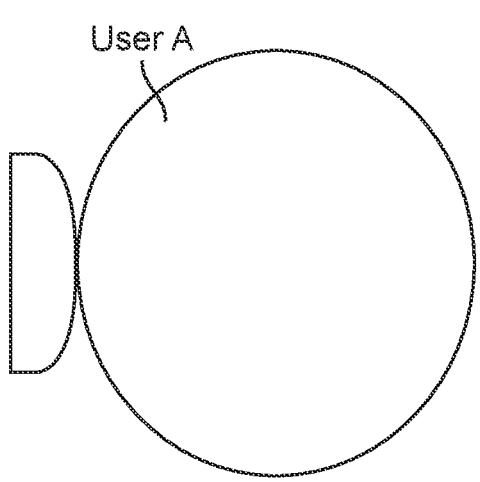
Figure 13D:
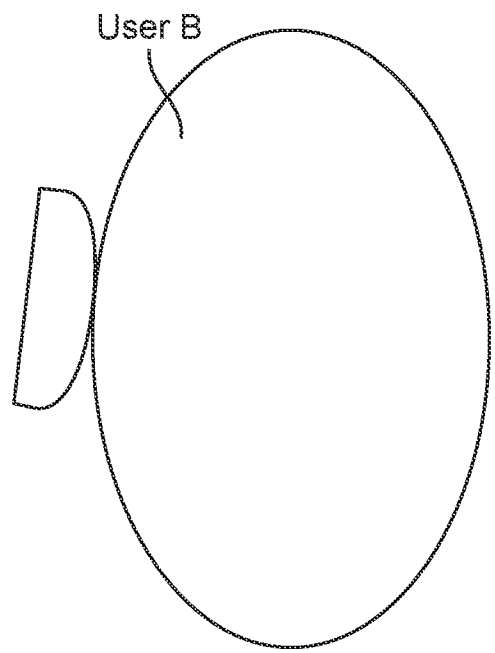

FIG. 13c shows a left pad having a convex interface surface that does not correspond to the contour of User A's head. The left pad contacts User A's head at a central region of the pad between the edges. The material may compress in response to the contact according to the compressibility properties of the pad material. No pressure hot spots are created. Referring to FIG. 13d, User B is illustrated wearing the same convex pad from FIG. 13c. Although User B's head shape is different from User A, the convex pad is able to accommodate the difference without introducing pressure hot spots. The left pad contacts User B's head at a central region of the pad between the edges. The material compresses in response to the contact according to the compressibility properties of the pad material. Thus, relying on a convex shape and compression of the material allows for many head sizes and shapes to be accommodated with the same padding shape without causing the pressure hotspots previously described. In some embodiments, the last portion of the pad to compress in response to contact with a user's head is the portion of the padding covering the edges of the wearable frame.

Figure 14:
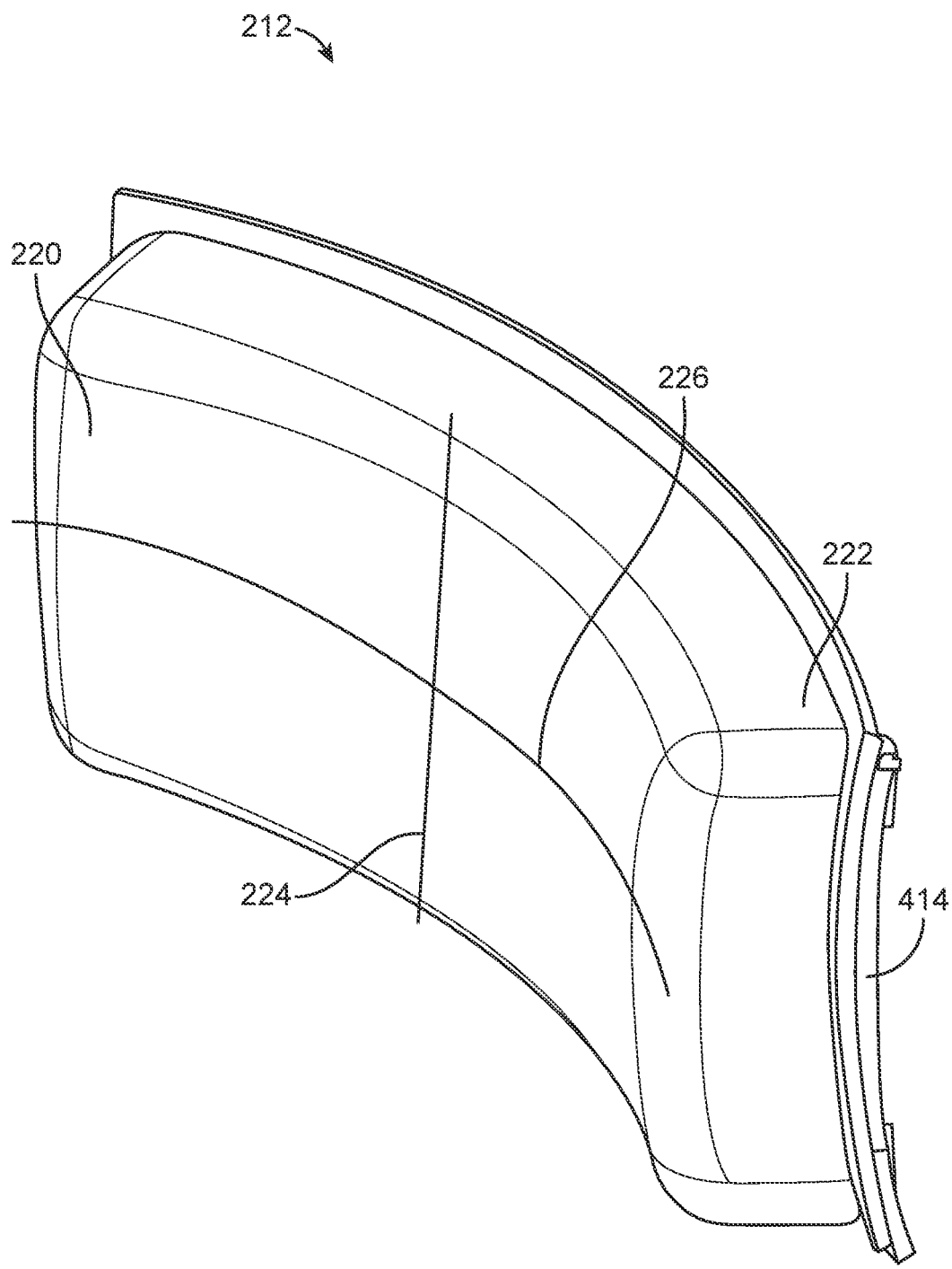
FIG. 14 depicts the left pad depicted in FIG. 12 with the addition of a carrier.
Figure 18:
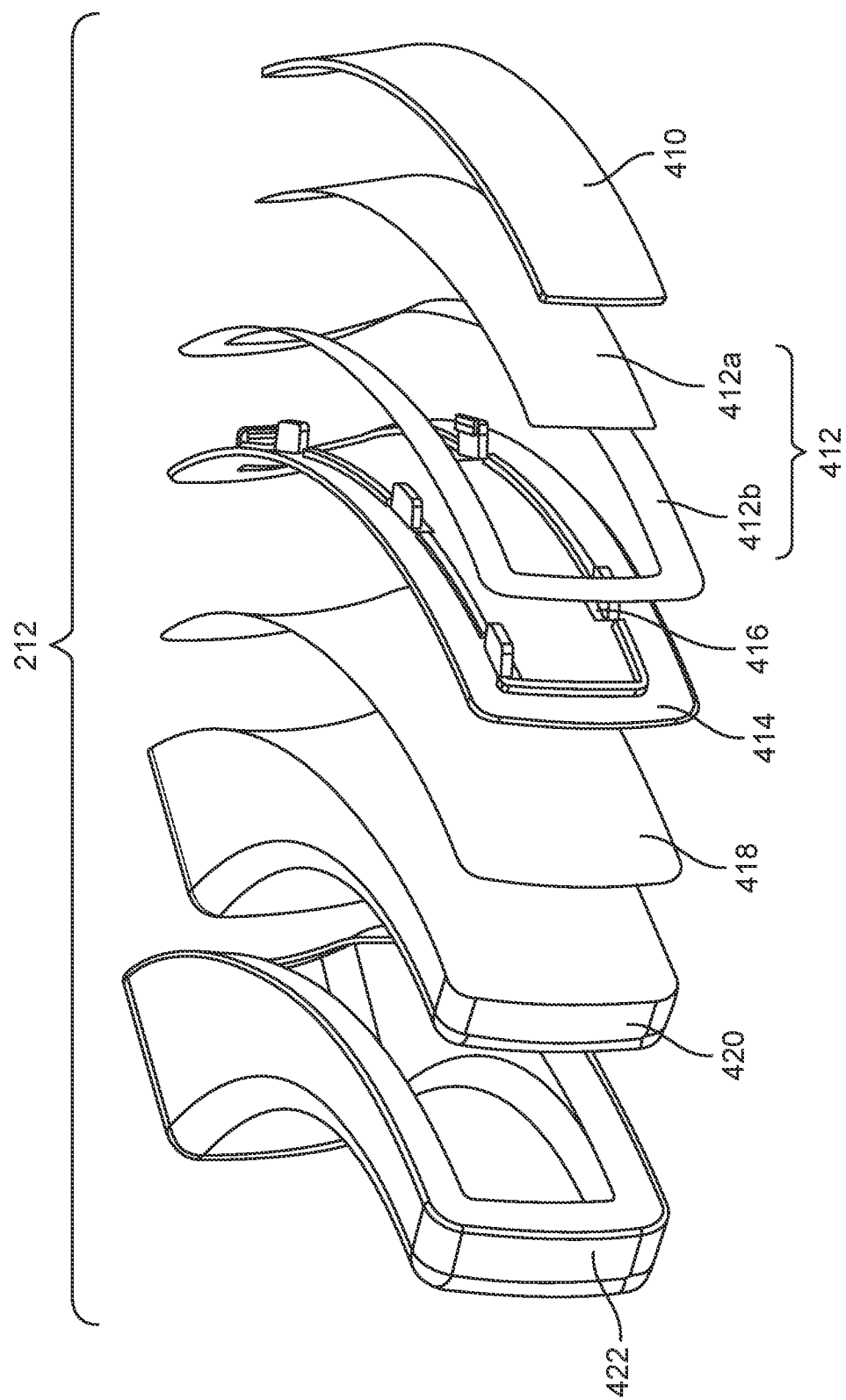
FIG. 18 depicts in an exploded view a left pad of contact modulating systems usable with VR/AR/MR systems, according to some embodiments.

FIG. 14 depicts the left pad 212 depicted in FIG. 12 including a carrier portion 414, which is depicted in FIG. 18 and described below.

Figure 15:
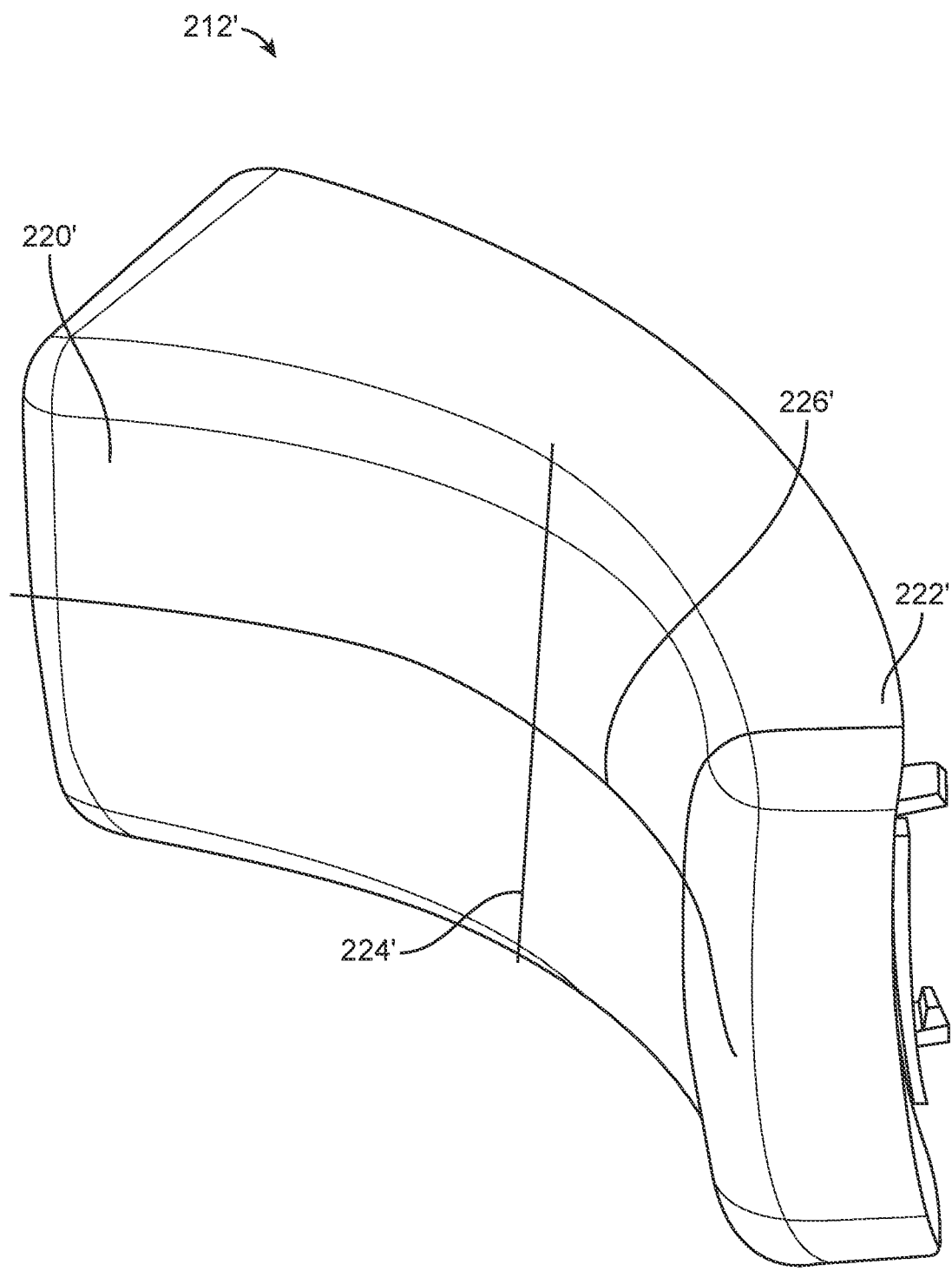
FIG. 15 depicts a left pad of contact modulating systems usable with VR/AR/MR systems, according to some embodiments.

FIG. 15 depicts a left pad 212' according to another embodiment. The left pad 212' in FIG. 15 has a shape similar to the shape of the left pad 212 in FIGS. 13 and 14. However, the left pad 212' in FIG. 15 is larger than the left pad 212 in FIGS. 13 and 14. Accordingly, the left pad 212' in FIG. 15 can be used with a larger wearable (not shown) to increase the number of users that can comfortably use the system.

The left pad 212' has an interior side 220' (i.e., facing toward the user), and an exterior side 222' (i.e., facing away from the user and toward the wearable (not shown)). The left pad 212' also has a first axis 224' and a second axis 226' that are substantially orthogonal to each other.

Figure 16:
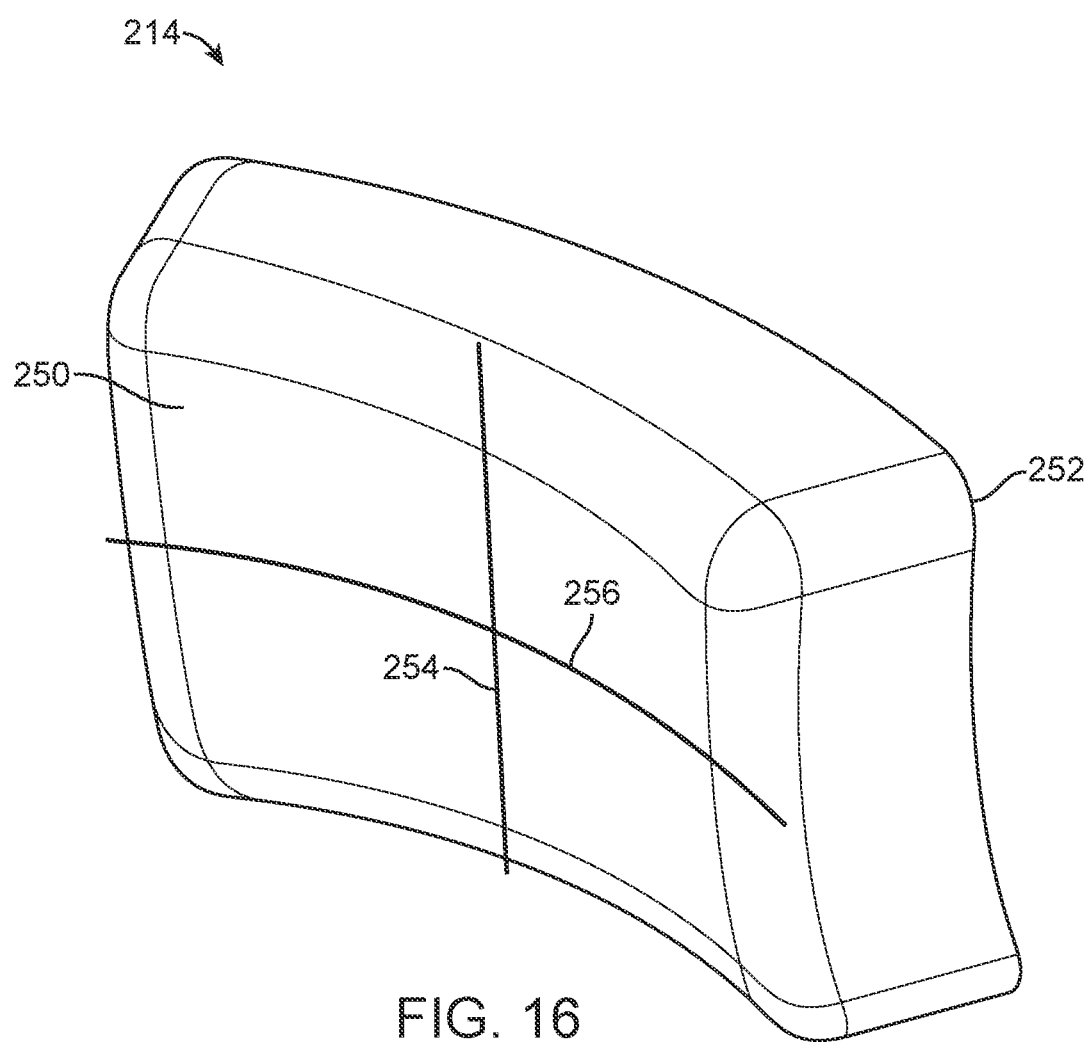
FIGS. 16 and 17 depict rear pads of contact modulating systems usable with VR/AR/MR systems, according to some embodiments.

FIG. 16 depicts a rear pad 214 according to one embodiment. The rear pad 214 has an interior side 250 (i.e., facing toward the user), and an exterior side 252 (i.e., facing away from the user and toward the wearable (not shown, see 214 in FIG. 7)). The rear pad 214 also has a first axis 254 and a second axis 256 that are substantially orthogonal to each other.

The rear pad 214 is substantially concave about the first axis 254, which is configured to approximate the shape of a typical user's head (i.e., approximately around an offset circumference of the user's head). The concavity about the first axis 254 allows the rear pad 214 to support the wearable 210 evenly across all points along the second axis 256. The rear pad 214 is substantially convex about the second axis 256. This design is the opposite of existing pads that are designed to maximize contact with the user's head by approximating the contours of the user's head so that even pressure is applied over the entire pad. A tangential relationship between the second axis 256 and the resultant force (see compressive reactive force C in FIG. 11) created by contact between the rear pad 214 and the user's 50 head is achieved with the convexity of the rear pad 214 as discussed above with respect to the left pad 212. This configuration reduces hotspots and increases user comfort when wearing the wearable 210 while providing stability and support.

Figure 17:
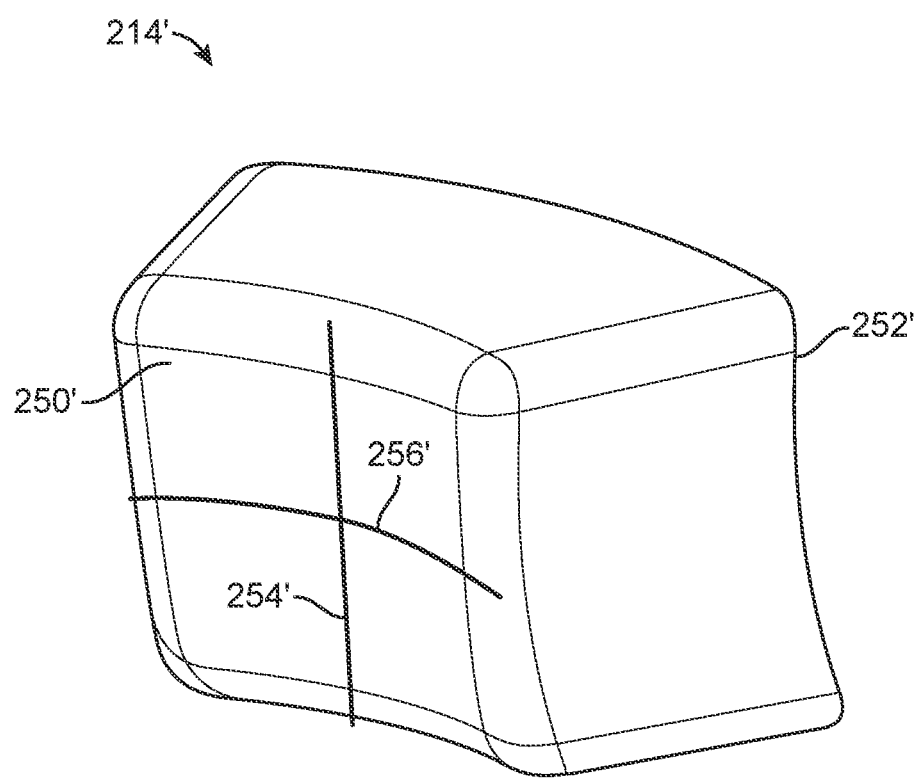

FIG. 17 depicts a rear pad 214' according to another embodiment. The rear pad 214' in FIG. 17 has a shape similar to the shape of the rear pad 214 in FIG. 16. However, the rear pad 214' in FIG. 17 is larger than the rear pad 214 in FIG. 16. In particular, a depth dimension between the interior side 250' and the exterior side 252' may be larger than the depth dimension between the interior side 250 and the exterior side 252 of rear pad 214 in FIG. 16. Accordingly, the rear pad 214' in FIG. 17 can be used with a larger wearable (not shown) to increase the number of users that can comfortably use the system. In some embodiments, users with an anthropometric head measurement from the forehead to the back of the head that is smaller than a pre-determined threshold dimension may use a larger pad for improved fit.

The rear pad 214' has an interior side 250' (i.e., facing toward the user), and an exterior side 252' (i.e., facing away from the user and toward the wearable (not shown)). The rear pad 214' also has a first axis 254' and a second axis 256' that are substantially orthogonal to each other.

FIG. 18 is an exploded view of a left pad 212 according to one embodiment. The left pad 212 includes a dampening portion 410 adjacent the interior side 220 (see FIG. 12) of the left pad 212. The dampening portion 410 is configured to minimize transmission of vibrations from the system to the user 50. The dampening portion 410 may include EVA foam. Without the dampening portion 410, audio components such as speakers 106 (see FIG. 1) may vibrate various other components and cause various unintended system noises (e.g., buzzing) by causing movement or contact between portions of the pad 212 and the frame 102 of the wearable 210 (see FIGS. 1 and 7).

The next layer in the left pad 212 is a first adhesive layer 412, which includes a first portion 412a and a second portion 412b. First portion 412a may be a pressure sensitive adhesive and second portion 412b may be a liquid adhesive. The first adhesive layer 412 is configured to couple the dampening portion 410 to a carrier portion 414, which is described below.

The next layer in the left pad 212 is the carrier portion 414, which may be made from a hard plastic. The carrier portion 414 is configured to removably couple the left pad 212 to a frame 102 of the wearable 210 (see FIGS. 1 and 7). In order to accomplish this removable coupling, the carrier portion 414 depicted in FIG. 18 includes a connector 416. In particular, the connector 416 is a snap fits connector/component. Removably coupling the left pad 212 allows the left pad 212 to be removed for cleaning, replaced due to wear, interchanged for a different size, or to allow multiple users to use the same wearable 210.

The next layer in the left pad 212 is a second adhesive layer 418. The second adhesive layer 418 may be a general adhesive. The second adhesive layer 418 may include only biocompatible adhesives.

The next layer in the left pad 212 is a compressible portion 420. The compressible portion 420 may include thermal formed polyurethane (PU) memory foam. The compressible portion 420 is configured to accommodate wearables and users of various sizes while maintaining stability and comfort. The compressible portion 420 is configured to increase the comfort of a user wearing the audio-visual display system/wearable 210.

The next layer in the left pad 212 is a cover portion 422. The cover portion 422 may include a non-permeable material such as PU. Other materials that can be cleaned, are antimicrobial, or have other properties beneficial for good hygiene can also be used such as microfiber and other textile materials. The cover portion 422 can contribute to bio compliance certification. The cover portion 422 may also have a textured surface (e.g., the leather type surface) to increase the frictional reactive force F depicted in FIGS. 10 and 11. The textured surface has an increased coefficient of friction compared to a non-textured outer surface. The cover portion 422 provides advantages such as aesthetics, feel, durability, stain resistance, etc.

Figure 19:
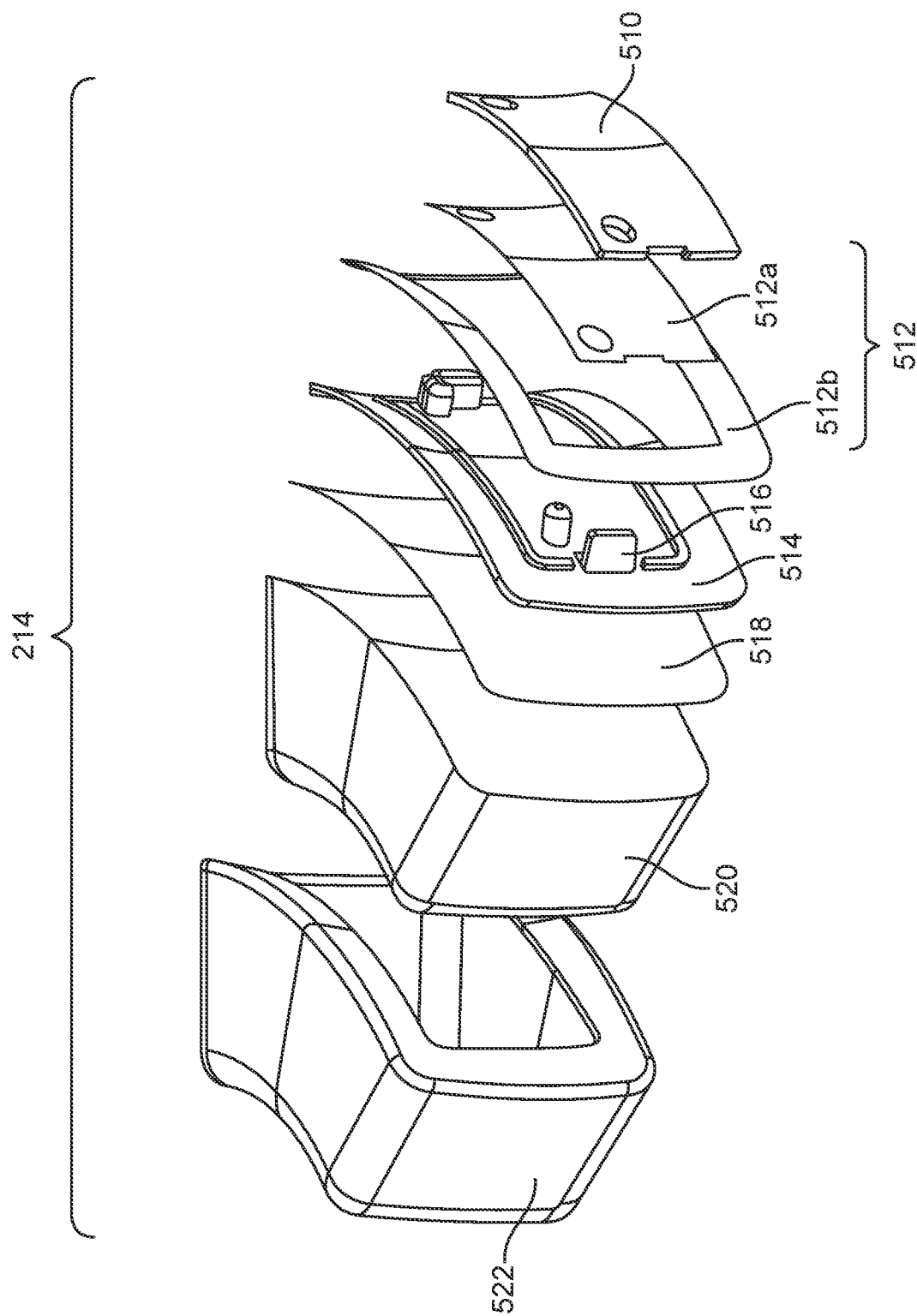
FIG. 19 depicts in an exploded view a rear pad of contact modulating systems usable with VR/AR/MR systems, according to some embodiments.

FIG. 19 is an exploded view of a rear pad 214 according to one embodiment. The rear pad 214 includes a dampening portion 510, a first adhesive layer 512, a carrier portion 514, a second adhesive layer 516, a compressible portion 520, and a cover portion 522. These portions of the rear pad 214 are almost identical to the corresponding portions of the left pad 212 depicted in FIG. 18. One difference between the rear pad 214 and the left pad 212 is their respective sizes and shapes.

Figure 20:
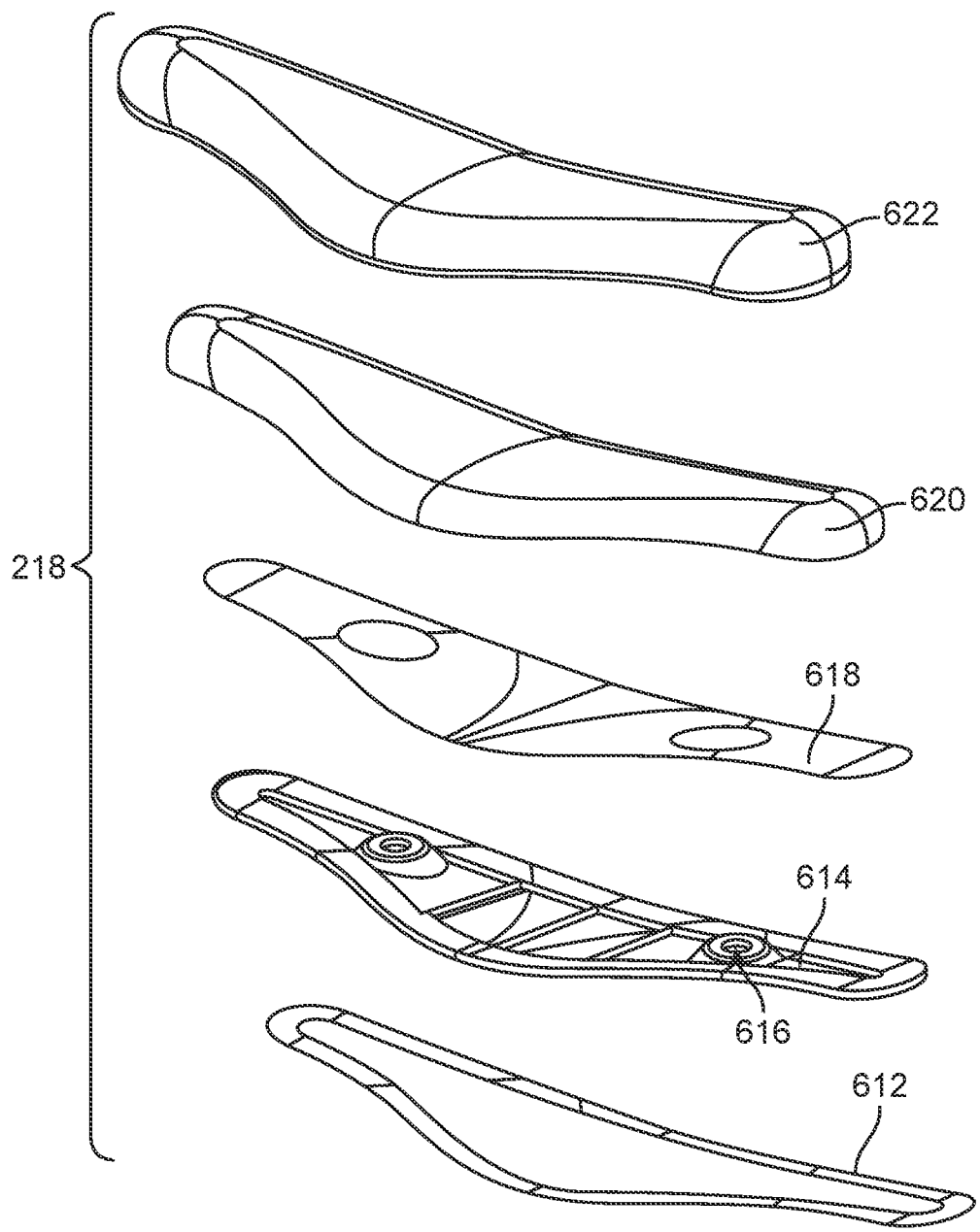
FIGS. 20 and 21 depict in exploded views front pads of contact modulating systems usable with VR/AR/MR systems, according to some embodiments.

FIG. 20 is an exploded view of a front pad 218 according to one embodiment. The front pad 218 includes a first adhesive layer 612, a carrier portion 614, a second adhesive layer 616, a compressible portion 620, and a cover portion 622. These portions of the front pad 218 are almost identical to the corresponding portions of the left pad 212 depicted in FIG. 18. One difference between the front pad 218 and the left pad 212 is their respective sizes and shapes. Another difference is that the front pad 218 depicted in FIG. 20 does not have a dampening portion. In some embodiments, front pad 218 further includes connector components (not shown) configured to allow easy fastening and removal to the frame 102 of the wearable. For example, mechanical fasteners, magnetic fasteners, or a combination can be used. Use of magnetic fasteners can reduce "play" between parts and the need for dampening.

Figure 21:
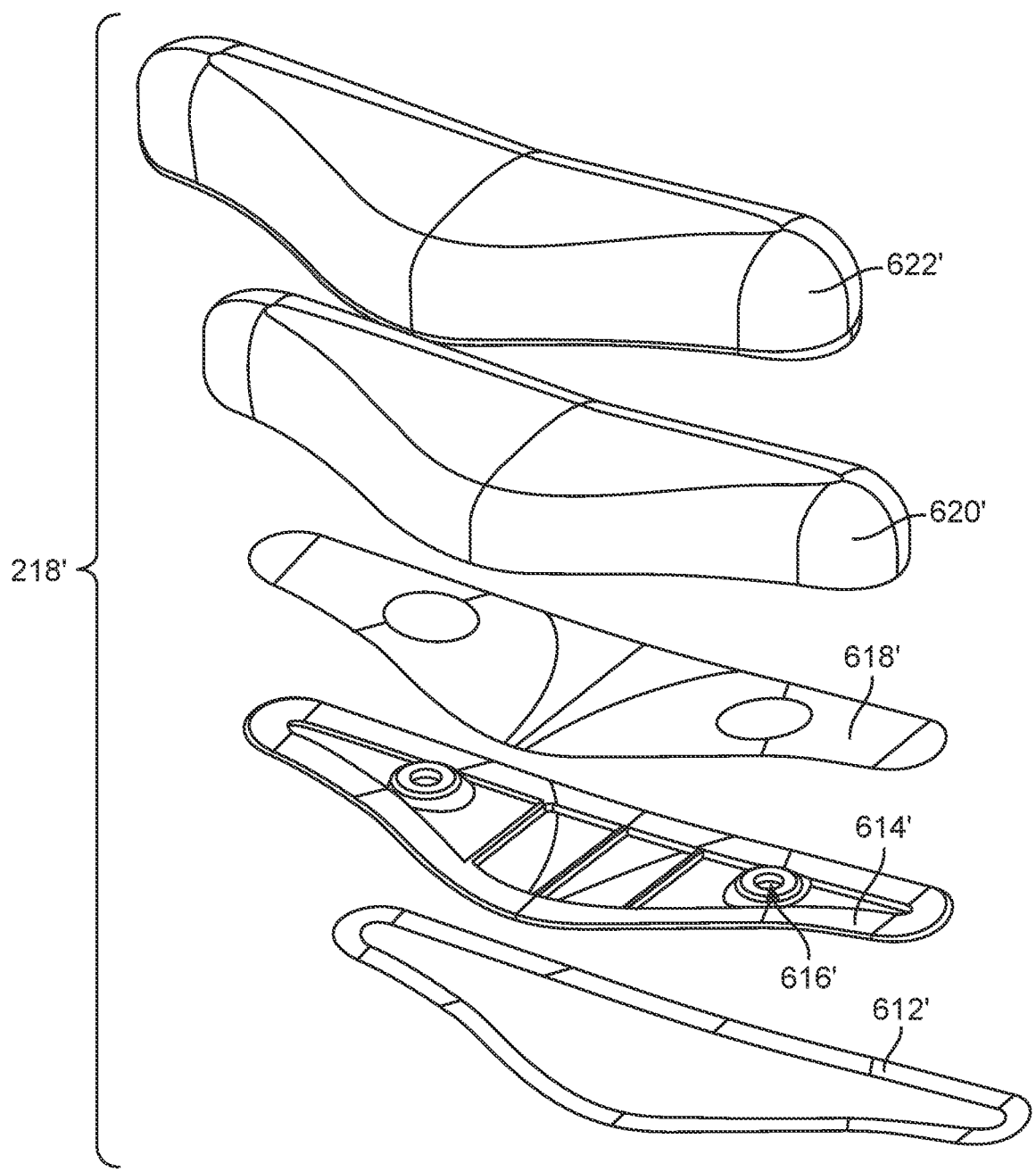

FIG. 21 is an exploded view of a front pad 218' according to another embodiment. The front pad 218' in FIG. 21 has a shape similar to the shape of the front pad 218 in FIG. 20. However, the front pad 218' in FIG. 21 is larger than the front pad 218 in FIG. 20. Accordingly, the front pad 218' in FIG. 21 can be used with a larger wearable (not shown) to increase the number of users that can comfortably use the system. In some embodiments, the larger front pad 218' can be interchanged or used in tandem with the smaller front pad 218 to accommodate different head sizes of a wide range of users. For example, in embodiments where the wearable includes a rigid frame with limited adjustability, a user with a small front-to-back head measurement may prefer to use the larger front pad 218' or both smaller pad 218 and larger pad 218' to help fill extra space in the wearable because such padding configurations have an increased thickness compared to the smaller front pad 218.

Figure 22:
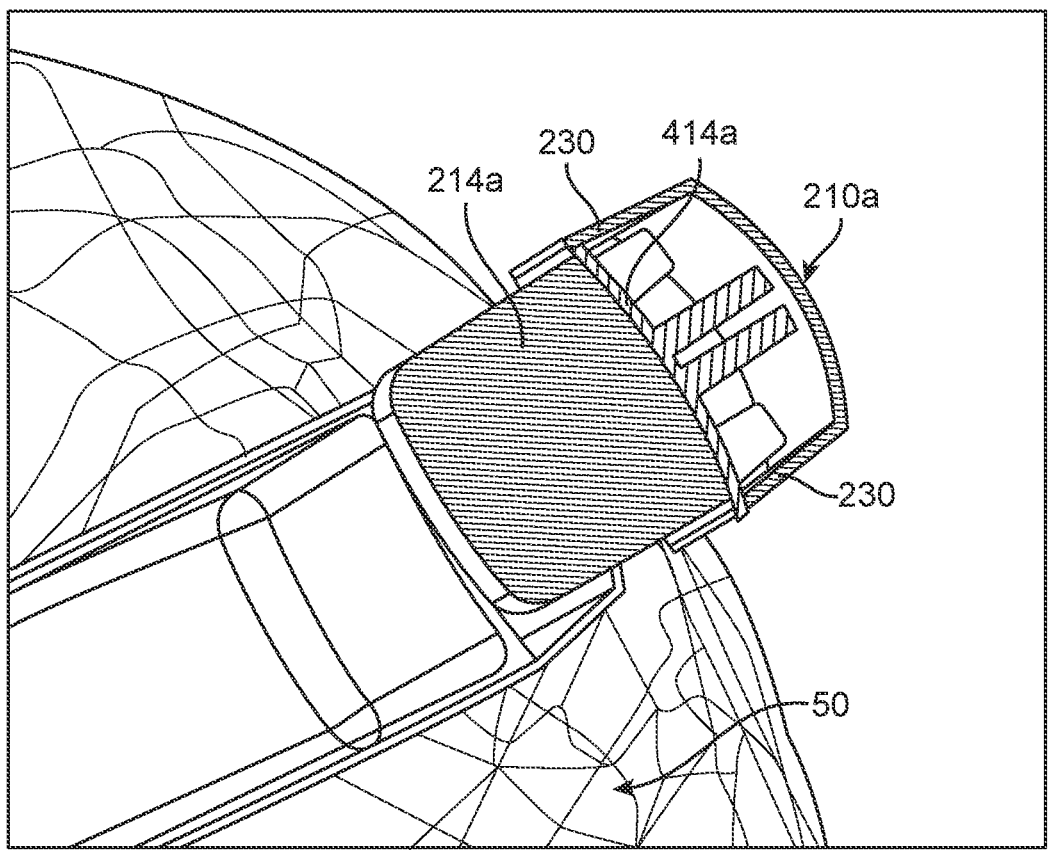
FIGS. 22 and 23 depict rear pads of contact modulating systems in use with VR/AR/MR systems, according to some embodiments.
Figure 23:
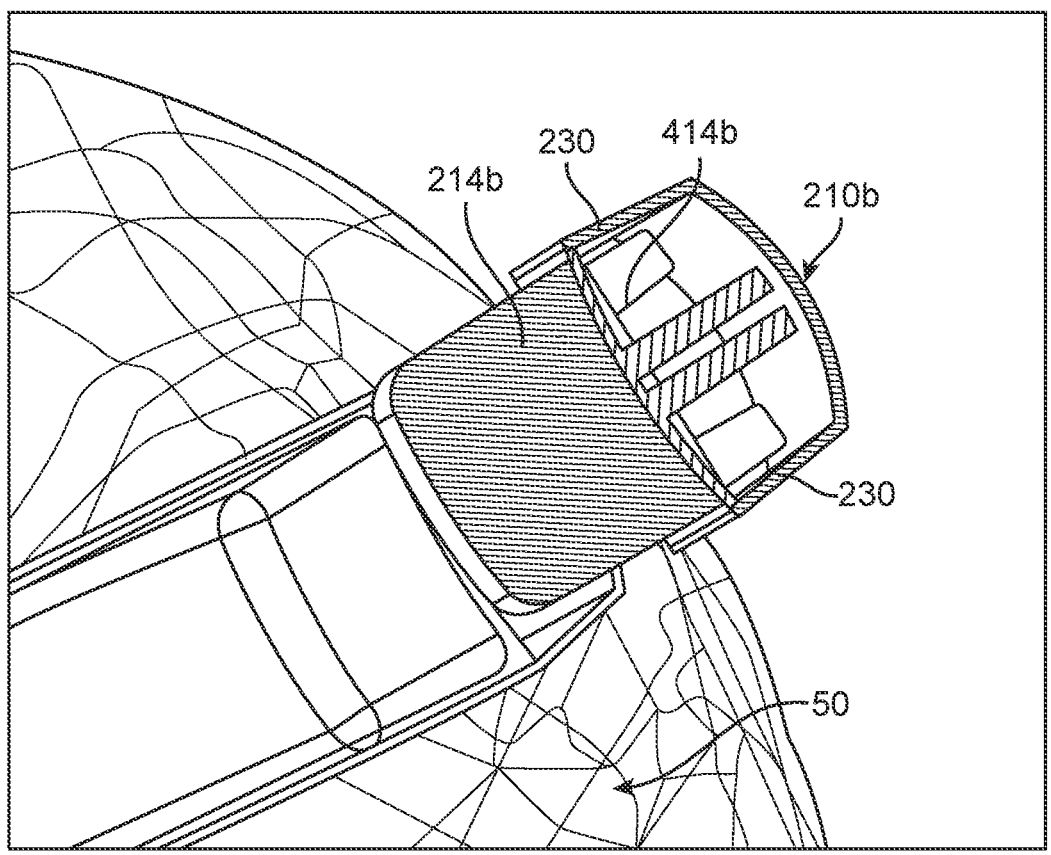

FIGS. 22 and 23 depict the effect of a convex carrier 414b versus a concave carrier 414a in respective carrier pads 214b, 214a. Because the padding system 210a in FIG. 22 includes a concave carrier 414a, sharp corners 230 on the wearable can make contact with the user's 50 head, causing user discomfort and reducing system usability. Because the padding system 210b in FIG. 23 includes a convex carrier 414b, sharp corners 230 on the wearable do not make contact with the user's 50 head, increasing user comfort and system usability.

Figure 24:
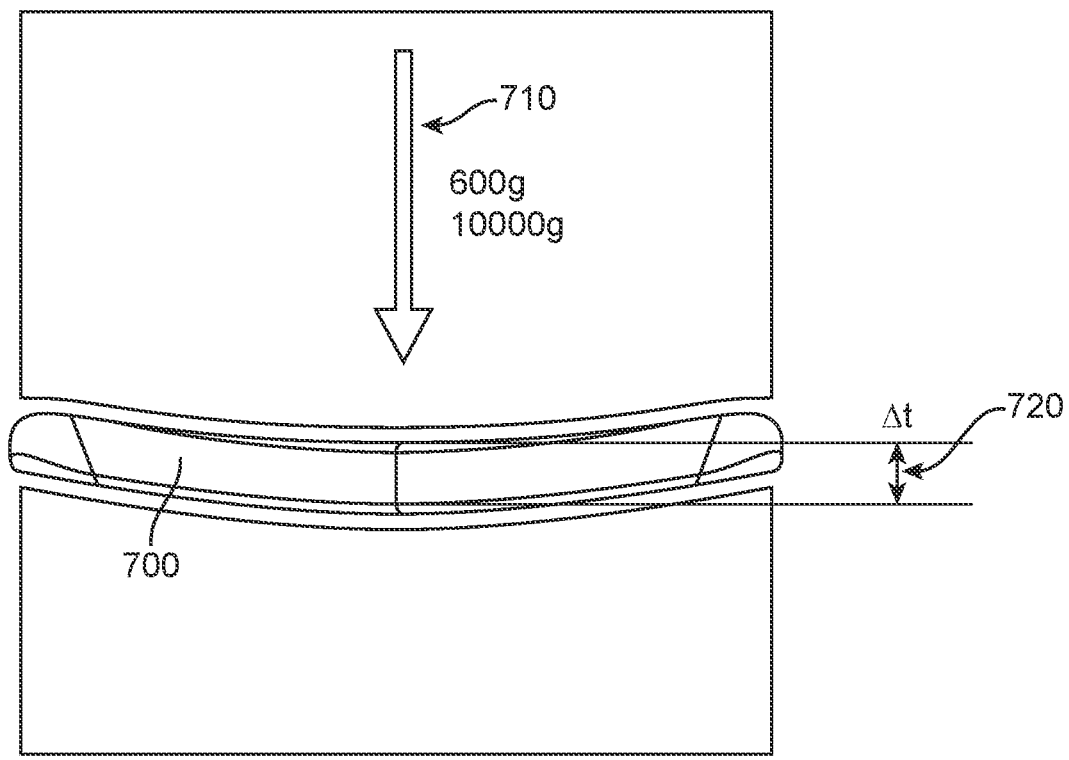
FIG. 24 depicts compression of a compressible material under load, according to some embodiments.

FIG. 24 depicts a compressible material 700, such as that in front pad 218, under load 710. The load 710 causes compression in the material 700 corresponding to a change in the thickness 720 of the material 700. In some embodiments, the compressible material 700 may be placed against a rigid surface that does not deflect under load 710. In such configurations, compressible material 700 accommodates the force of load 710 by deflecting and changing thickness in accordance with the material properties of compressible material 700.

Figure 25:
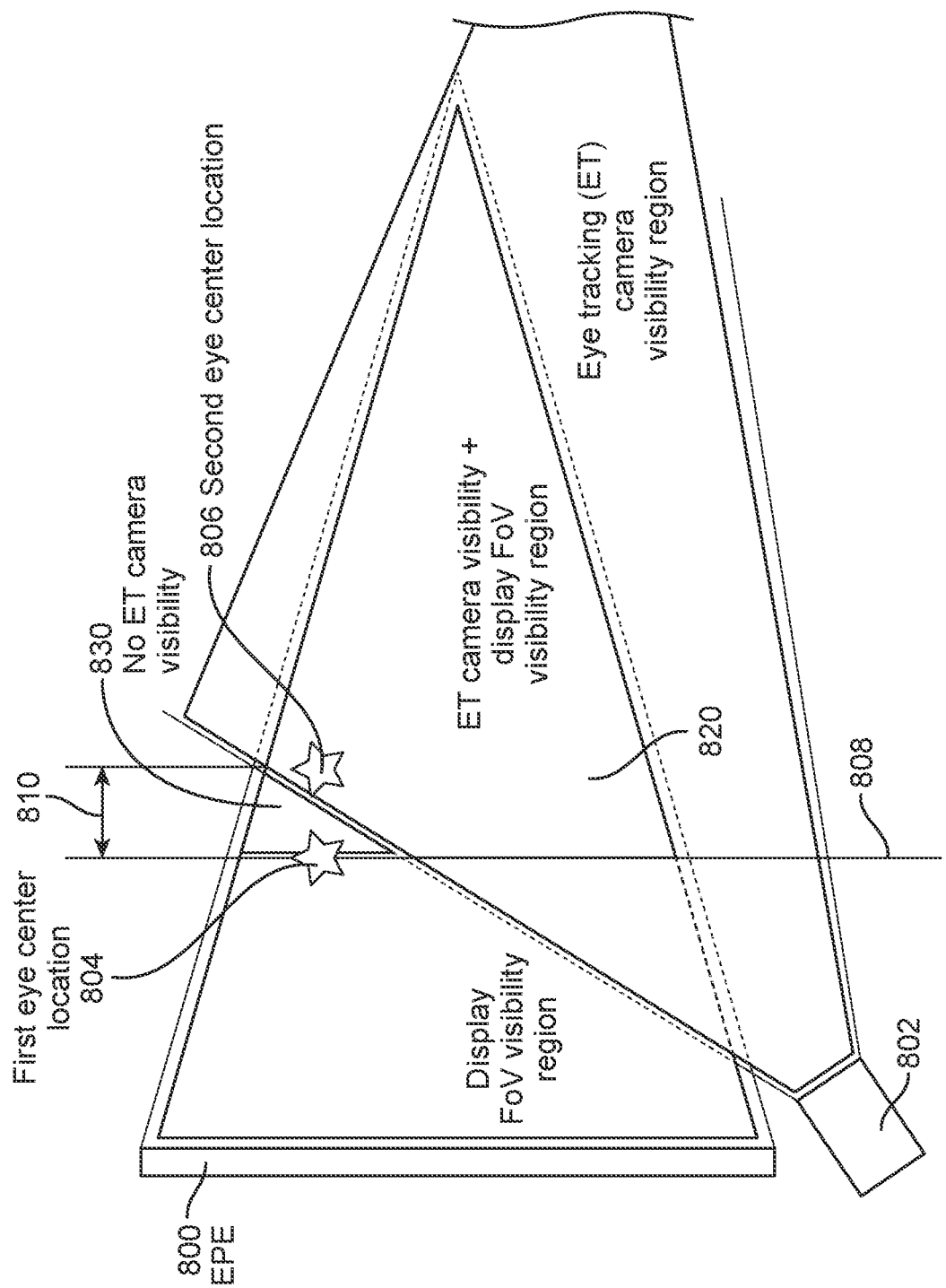
FIG. 25 depicts various functional zones relative to a display/exit pupil expander, according to some embodiments.

FIG. 25 depicts various functional zones relative to a display/exit pupil expander 800. If a user's eye is positioned in zone 820, the user's eye can see the display 800 and the eye tracking (ET) sensor 802 can detect the user's eye. In zone 830, while the user's eye can see the display 800, the eye tracking sensor 802 cannot detect the user's eye. In one embodiment, increasing the distance between the wearable and the user's 50 forehead moves the user's eye into zone 820 where both the display field of view and eye tracking sensor visibility are acceptable and where the user's eyelashes are far enough away from the display to prevent contact during a blink (boundary 808). One or more front pads can be designed to accommodate this function.

For example, if the user dons the wearable with the small front pad 218 and the eye is positioned at first location 804 with respect to the EPE 800 and the eye tracking sensor 802, the user's eye is at a point within zone 830 that is furthest away from zone 820; the eye should be within zone 820 to be able to see the full display field of view, for the eye tracking sensor to see and track the user's eye, and to prevent the user's eyelashes from contacting the display with EPE 800 during a blink. In some embodiments, the dimension 810 of the zone 830 is approximately 3 mm. Thus, to move the eye from the innermost boundary of zone 830 into zone 820, the user's eye must move away from the EPE 800 and eye tracking sensor 802 by at least 3 mm. Another front pad (e.g., 218') may be provided in addition to or in place of the small front pad that can move the user's head away from the EPE 800 and the user's eye to a second location 806 in zone 820.

FIGS. 26 to 33 depict a left pad 212 according to some embodiments from various views. FIGS. 34 to 41 depict a rear pad 214 according to some embodiments from various views. FIGS. 42 to 49 depict a right pad 216 according to some embodiments from various views. FIGS. 50 to 57 depict a front pad 218 according to some embodiments from various views.

The disclosure includes methods that may be performed using the subject devices. The methods may comprise the act of providing such a suitable device. Such provision may be performed by the user. In other words, the "providing" act merely requires the user to obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

The invention claimed is:

1. A padding system for a head mounted device wearable on a head of a user, the padding system comprising:
   a pad having an interior side facing toward the head of the user of the head mounted device and an exterior side facing away from the head of the user, wherein
   the interior side of the pad, in an uncompressed state, comprises:
      a substantially concave first curvature about a first axis of the pad, wherein the interior side of the pad including the substantially concave first curvature approximates a shape of the head of the user, and
      a substantially convex second curvature about a second axis that is substantially perpendicular to the first axis, wherein the interior side of the pad including the substantially convex second curvature comprises a central region extending between a first edge and a second edge, and the central region does not approximate the shape of the head of the user, and
   the pad is compressible according to compressibility of the pad material in response to a force resulting from contact between the exterior side of the pad and a frame of the head mounted device so that when the pad is in a compressed state, the central region of the interior side of the pad extending between the first edge and the second edge is configured to contact the head of the user and direct a force resulting from contact between the pad and the head of the user toward a direction that is tangential to the second axis.

2. The system of claim 1, wherein the pad is configured to minimize hotspots or sharp corners between the frame of the head mounted device and the head of the user.

3. The system of claim 1, wherein the pad is configured to direct a force normal corresponding to the frame to the center of the pad.

4. The system of claim 3, wherein the pad is configured to increase stability of the head mounted device worn by the user.

5. The system of claim 1, the pad comprising:
a first portion adjacent the interior side;
a first adhesive layer adjacent to and external of the first portion;
a carrier adjacent to and external of the first adhesive layer;
a second adhesive layer adjacent to and external of the carrier;
a second portion adjacent to and external of the second adhesive layer; and
a cover adjacent to and external of the second portion.

6. The system of claim 5, wherein the first portion is configured to dampen vibrations from the head mounted device.

7. The system of claim 5, wherein the first adhesive layer comprises an adhesive layer and a liquid adhesive.

8. The system of claim 5, wherein the carrier comprises a snap-fit component configured to removably couple the pad to the frame.

9. The system of claim 5, wherein the second portion is configured to increase stability of the head mounted device worn by the user.

10. The system of claim 5, wherein the cover comprises a non-permeable material.

11. The system of claim 5, wherein the cover comprises a textured outer surface having an increased coefficient of friction compared to a non-textured outer surface.

12. The system of claim 1, wherein audio-visual display components of the head mounted device are mounted to the frame, and the pad is configured to be removably coupled to the frame by a snap fit connector.

13. The system of claim 1, wherein interior side of the pad is configured so that the central region extending between the first edge and the second edge and contacting the head of the user does not maximize contact with the user's head.

14. A padding system for a head mounted device, comprising:
first and second front pads;
a rear pad; and
left and right side pads,
where each of the first and second front pads, the rear pad, and the left and right side pads has an interior side facing toward a head of a user of the head mounted device and an exterior side facing away from the head of the user, wherein each interior side of each of the first and second front pads, the rear pad, and the left and right side pads, comprises:
a substantially concave first curvature about a first axis of the pad, wherein the interior side of the pad including the substantially concave first curvature approximates a shape of the head of the user, and
a substantially convex second curvature about a second axis that is substantially perpendicular to the first axis, wherein the interior side of the pad including the substantially convex second curvature comprises a central region extending between a first edge and a second edge, and the central region does not approximate the shape of the head of the user
the pad is compressible according to compressibility of the pad material in response to a force resulting from contact between the exterior side of the pad and a frame of the head mounted device so that when the pad is in a compressed state, the central region of the interior side of the pad extending between the first edge and the second edge is configured to contact the head of the user and direct a force resulting from contact between the pad and the head of the user toward a direction that is tangential to the second axis.

15. The system of claim 14, wherein a line from a center of the first and second front pads to a center of the rear pad forms an angle with a transverse plane of the user's head.

16. The system of claim 15, wherein the angle is about 10 degrees.

17. The system of claim 14, wherein the substantially convex second curvature of the rear pad is less convex than the substantially convex second curvature of the left and right side pads.

18. The system of claim 14, wherein the first and second front pads are stiffer than the rear pad and the left and right side pads.

19. The system of claim 14, wherein the first and second front pads have a smaller than 3 mm change in thickness between an uncompressed, unworn state and a compressed, worn state.

20. The system of claim 14, wherein audio-visual display components of the head mounted device are mounted to the frame, and each pad is configured to be removably coupled to the frame by a snap fit connector.

21. The system of claim 14, wherein each interior side of each of the first and second front pads, the rear pad and the left and right pads is configured so that the central region extending between the first edge and the second edge and contacting the head of the user does not maximize contact with the user's head.

* * * * *